US011973831B2

(12) United States Patent
Cornwall et al.

(10) Patent No.: US 11,973,831 B2
(45) Date of Patent: *Apr. 30, 2024

(54) DISAGGREGATION OF GAS LOAD TO DETERMINE GAS APPLIANCE PERFORMANCE

(71) Applicant: Itron, Inc., Liberty Lake, WA (US)

(72) Inventors: Mark K. Cornwall, Spokane, WA (US); James Lee Kann, Mica, WA (US); Peter Clevenger, Liberty Lake, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,780

(22) Filed: Feb. 27, 2023

(65) Prior Publication Data

US 2023/0224367 A1 Jul. 13, 2023

Related U.S. Application Data

(63) Continuation of application No. 17/127,678, filed on Dec. 18, 2020, now Pat. No. 11,601,506.

(51) Int. Cl.
*H04L 67/125* (2022.01)
*G01D 4/00* (2006.01)
*G01F 25/10* (2022.01)

(52) U.S. Cl.
CPC ........... *H04L 67/125* (2013.01); *G01D 4/002* (2013.01); *G01D 4/008* (2013.01); *G01F 25/15* (2022.01)

(58) Field of Classification Search
CPC ...... H04L 67/125; G01D 4/002; G01D 4/008; G01D 2204/22; G01D 2204/24;
(Continued)

(56) References Cited

U.S. PATENT DOCUMENTS 2,302,284 A 11/1942 Abbott
5,878,779 A 3/1999 Bircann et al.
(Continued)

FOREIGN PATENT DOCUMENTS

CN 104314527 10/2017
EP 1062645 11/2002
(Continued)

OTHER PUBLICATIONS

Anwar, F., et al., Network-Based Real-time Integrated Fire Detection and Alarm (FDA) System with Building Automation 6th Intl. Conf. on Mechatronics, ICOM'17, IOP Conf. Series: Materials Science & Engineering, vol. 260, No. 012025, Aug. 8-9, 2017, Kuala Lumpur, Malaysia, at <http://iopscience.iop.org/article/10.1088/1757-899X/260/1/012025/meta>, 16 pages.
(Continued)

*Primary Examiner* — Javier O Guzman
(74) *Attorney, Agent, or Firm* — Lee & Hayes P.C.

(57) ABSTRACT

Techniques determine if an appliance having a fixed-rate of gas-consumption is degrading over time. In one example, a flowrate of gas at a service site is obtained. The flowrate of gas is disaggregated to obtain a flowrate of gas corresponding to an appliance having a generally fixed-rate of gas-consumption. The flowrate of gas of the appliance is compared to historical gas consumption by the appliance. Based at least in part on the comparing, it may be determined that performance of the appliance has changed over time. For example, the gas consumption of a hot water tank may increase due to mineral build-up in the bottom of the tank. Responsive to the determined degradation of the appliance, warnings may be sent, repairs may be made, and/or appliance(s) may be replaced.

20 Claims, 16 Drawing Sheets

(58) Field of Classification Search
CPC ....... G01D 4/004; G01F 25/15; G01F 15/063; G01F 15/066; G01F 15/0755; H04W 4/38
See application file for complete search history.

(56) References Cited

U.S. PATENT DOCUMENTS

| | | |
|---|---|---|
| 7,458,387 B2 | 12/2008 | McGill |
| 7,759,948 B2 | 7/2010 | Tischendorf et al. |
| 7,980,136 B2 | 7/2011 | Ben-Mansour |
| 8,054,199 B2 | 11/2011 | Addy |
| 8,485,213 B2 | 7/2013 | Hawkins et al. |
| 9,928,720 B2 | 3/2018 | Cornwall |
| 9,939,341 B2 | 4/2018 | McNab et al. |
| 10,704,946 B2 | 7/2020 | Seehoffer |
| 10,948,131 B1 | 3/2021 | Francis |
| 11,047,496 B1 | 6/2021 | McConnell |
| 2004/0187930 A1 | 9/2004 | Hawkins et al. |
| 2006/0248032 A1 | 11/2006 | Jellum et al. |
| 2008/0270045 A1* | 10/2008 | Miyata ............... G01F 15/0755 702/45 |
| 2009/0018782 A1 | 1/2009 | Sameda et al. |
| 2009/0198384 A1* | 8/2009 | Ahn .................. H02J 13/00002 700/295 |
| 2009/0240445 A1 | 9/2009 | Umekage et al. |
| 2010/0017150 A1* | 1/2010 | Itou ............................ G01F 1/66 702/45 |
| 2010/0156632 A1 | 6/2010 | Hyland et al. |
| 2010/0188261 A1* | 7/2010 | Fujii ......................... G01F 1/66 431/13 |
| 2010/0229653 A1 | 9/2010 | Tabellario |
| 2010/0269596 A1 | 10/2010 | Miyata et al. |
| 2011/0254696 A1 | 10/2011 | Cornwall et al. |
| 2011/0288793 A1* | 11/2011 | Sanchez-Loureda ....................... G01D 4/002 702/45 |
| 2011/0313964 A1* | 12/2011 | Sanchey Loureda ... H02J 3/003 706/50 |
| 2012/0022812 A1 | 1/2012 | Longtin |
| 2012/0111799 A1 | 5/2012 | Lemoine et al. |
| 2012/0112901 A1 | 5/2012 | Chasko |
| 2012/0136593 A1 | 5/2012 | Donaldson et al. |
| 2012/0173252 A1* | 7/2012 | Mak ........................ H02J 3/008 709/224 |
| 2012/0174655 A1 | 7/2012 | Essich |
| 2013/0035884 A1* | 2/2013 | Burke ........................ H02J 3/14 702/61 |
| 2013/0096857 A1* | 4/2013 | Chakradhar ........... G01D 4/002 324/142 |
| 2013/0110621 A1* | 5/2013 | Gupta ..................... G01D 4/004 702/60 |
| 2013/0204399 A1* | 8/2013 | Donaldson .............. G06F 17/18 702/179 |
| 2013/0262197 A1 | 10/2013 | Kaulgud et al. |
| 2014/0130878 A1 | 5/2014 | Marinez |
| 2014/0207392 A1* | 7/2014 | Cornwall ................ G01D 4/00 702/45 |
| 2014/0231531 A1 | 8/2014 | van der Donk et al. |
| 2016/0001114 A1 | 1/2016 | Hyland et al. |
| 2016/0327603 A1 | 11/2016 | Sonderegger et al. |
| 2016/0334029 A1 | 11/2016 | French |
| 2017/0193790 A1 | 7/2017 | Cornwall |
| 2019/0025150 A1 | 1/2019 | Picardi et al. |
| 2019/0234786 A1 | 8/2019 | Klicpera |
| 2019/0242741 A1 | 8/2019 | Idris et al. |
| 2019/0289077 A1* | 9/2019 | Sacchetti ................ H04L 67/54 |
| 2019/0323918 A1 | 10/2019 | Sahoo |
| 2020/0003606 A1* | 1/2020 | Yu ........................... G01F 25/15 |
| 2020/0124195 A1 | 4/2020 | Monk |
| 2020/0132219 A1 | 4/2020 | Thompson et al. |
| 2020/0173810 A1 | 6/2020 | Verma et al. |
| 2020/0386732 A1 | 12/2020 | Park et al. |
| 2021/0190568 A1 | 6/2021 | Haag et al. |
| 2021/0392604 A1 | 12/2021 | Deshmukh |
| 2022/0128428 A1* | 4/2022 | Clark ..................... G05D 7/0635 |
| 2022/0196183 A1 | 6/2022 | Kann et al. |
| 2022/0196448 A1 | 6/2022 | Cornwall et al. |
| 2022/0196451 A1 | 6/2022 | Cornwall et al. |
| 2022/0196454 A1 | 6/2022 | Cornwall et al. |
| 2022/0198904 A1 | 6/2022 | Kann et al. |
| 2022/0201082 A1 | 6/2022 | Cornwall et al. |
| 2022/0412787 A1 | 12/2022 | Kann |
| 2023/0005353 A1 | 1/2023 | Kann |

FOREIGN PATENT DOCUMENTS

| | | | |
|---|---|---|---|
| EP | 2477088 | 7/2012 | |
| IT | 201900006012 A1 | 10/2020 | |
| WO | WO2009075082 | 6/2009 | |
| WO | WO2010111699 | 9/2010 | |
| WO | WO2011068273 | 8/2012 | |
| WO | WO2012106709 | 8/2012 | |
| WO | WO2012156758 | 11/2012 | |
| WO | WO-2012156758 A1 * | 11/2012 | ............... G01D 4/00 |
| WO | WO2016170870 A1 | 10/2016 | |
| WO | WO2017061994 A1 | 4/2017 | |
| WO | WO2018209238 | 11/2018 | |

OTHER PUBLICATIONS

Artim, N., Emergency Management, 3.2 An Introduction to Fire Detection, Alarm, & Automatic Fire Sprinklers Northeast Document Conservation Center, Nov. 28, 2018, at <https://www.nedcc.org/free-resources/preservation-leaflets/3.-emergency-management/3.2-an-introduction-to-fire-detection,-alarm,-and-automatic-fire-sprinklers>, 26 pages.

"Automated Flushing Gives Water Savings," Elsevier Ltd., Nov. 6, 2019, at <https://www.filtsep.com/water-and-wastewater/features/automated-flushing-gives-water-savings/>, 3 pages.

"Backflow Prevention—What does it Mean to You?", American Backflow Prevention Association, found at <https://www.abpa.org/page/BackflowPrevention#>, date unknown, printed on Jan. 8, 2021, 2 pages.

Dreher, A., et al., "*E. coli* Found In Some Contaminated Hillyard Water This Weekend," The Spokesman-Review, Spokane, Washington, Jul. 31, 2019, at <https://www.spokesman.com/stories/2019/jul/31/e-coli-found-in-some-contaminated-hillyard-water-t/>, 6 pages.

Energy Systems, Electricity, and Fire Safety# Course AP 312, University School of Planning and Architecture, Guru Gobind Singh Indraprastha University, Delhi, IN, published Jun. 13, 2015, found at <https://www.slideshare.net/supergirlanchal/energy-systems-electricity-and-fire-safety>, 41 pages.

Fontanazza, C., et al., "Contaminant intrusion through leaks in water distribution system: experimental analysis," Procedia Engineering, vol. 19 (2015), 13th Computer Control for Water Industry Conference, CCWI 2015, Sep. 2-4, 2015, Leicester, UK, pp. 426-433.

Hopf, Dr. S., "Application Models for the Power Distribution: High-rise Buildings", copyright 2012, Siemens Aktiengesellschaft, Berlin and Munich, Germany, found at <https://www.siemens.com/content/dam/webassetpool/mam/tag-siemens-com/smdb/energy-management/services-power-transmission-power-distribution-smart-grid/consulting/tip-planungshandb%C3%BCcher/application-model-for-high-rise-buildings.pdf>, printed from Internet on Nov. 28, 2018, 96 pages.

"How Much Does an Industrial Water Treatment System Cost?", found at <https://www.samcotech.com/how-much-does-an-industrial-water-treatment-system-cost/>, SAMCO, dated Sep. 22, 2017, 4 pages.

Kapis, J., et al., Integration: Building Automation and Fire Alarms# Insights, Schneider Electric US, date unknown, found online at <https://www.schneider-electric.us/en/work/insights/integration-building-automation-and-fire-alarms.jsp>, obtained from Internet on Nov. 28, 2018, 9 pages.

Manual of Design and Specification Standards, Div 16 Electrical, Section 16720 Fire Alarm Systems, University of Arizona, Mar. 2004, found at <https://pdc.arizona.edu/dssarchive/rev4/16720.pdf>, obtained from the Internet on Nov. 28, 2018, 3 pages.

(56) References Cited

OTHER PUBLICATIONS

Mar, et al., Integrating BAS, Electrical Systems# Insights, Schneider Electric UK, date unknown, found online at <https://www.schneider-electric.co.uk/en/work/insights/integrating-bas-electrical-systems.jsp>, obtained from Internet on Nov. 28, 2018, 9 pages.

Non-Final Office Action dated Jan. 29, 2020, for U.S. Appl. No. 16/206,121, 12 pages.

Office Action for U.S. Appl. No. 16/454,625, dated Feb. 23, 2021, Sahoo, "Measuring Contamination To Determine Leak Location", 10 Pages.

Office Action for U.S. Appl. No. 17/127,841, dated Sep. 19, 2022, Kann, "Gas Regulator Diaphragm—Position and Pressure-Relief Detection ", 12 pages.

Office action for U.S. Appl. No. 13/747,295, dated Jan. 19, 2017, Cornwall, "System to Identify Gas Usage by Appliance", 24 pages.

Office Action for U.S. Appl. No. 17/939,856, dated Jan. 25, 2023, Kann, "Network Edge Detection and Notification of Gas Pressure Situation ", 23 pages.

Office Action for U.S. Appl. No. 17/127,896, dated Oct. 7, 2021, Kann, "Network Edge Detection and Notification of Gas Pressure Situation ", 21 Pages.

Office action for U.S. Appl. No. 13/747,295, dated Nov. 18, 2015, Cornwall, "System to Identify Gas Usage by Appliance", 14 pages.

Office action for U.S. Appl. No. 17/127,713, dated Nov. 25, 2022, Cornwall et al., "Disaggregation of Gas Load to Determine Meter or Service Under-Sizing ", 26 pages.

Office action for U.S. Appl. No. 13/747,295, dated Mar. 4, 2016, Cornwall, "System to Identify Gas Usage by Appliance", 12 pages.

Office Action for U.S. Appl. No. 17/127,678, dated May 24, 2022, Cornwall, "Disaggregation of Gas Load to Determine Gas Appliance Performance", 21 Pages.

Office Action for U.S. Appl. No. 17/127,678, dated Jul. 20, 2022, Cornwall, "Disaggregation of Gas Load to Determine Gas Appliance Performance", 21 pages.

PCT Search Report and Written Opinion dated Apr. 8, 2014 for PCT Application No. PCT/US13/68213, 9 Pages.

PCT Search Report dated Mar. 28, 2018 for PCT application No. PCT/US2017/067827, 19 pages.

International Preliminary Report on Patentability for PCT Application No. PCT/US21/53001, dated Feb. 8, 2022.

International Preliminary Report on Patentability for PCT Application No. PCT/US21/53007, dated Feb. 3, 2022.

PCT International Search Report and Written Opinion dated Feb. 19, 2020, for PCT Application No. PCT/US2019/063002, 14 pages.

"Potential Contamination Due to Cross-Connections and Backflow and the Associated Health Risks," U.S. Environmental Protection Agency Office of Ground Water and Drinking Water Standards and Risk Management Division, Washington DC, Sep. 27, 2001, 44 pages.

"Remotely Control and Automatically Optimise Pressure in Your Entire Network," oNet, i20 Solutions, dated Feb. 20, 2018, 2 pages.

Segura, "Use of hydroinformatics technologies for real time water quality management and operation of distribution networks. Case sutdy of Villavicencio, Colombia", Mar. 1, 2006, Delft, Netherlands, retrieved from the internet at URL:https://www.un-ihe.org/sites/default/files/leonardo_alfonso_msc.pdf on Mar. 20, 2018.

White, R., "Liberty Lake Water Contamination Will Likely Require a Week of Boiling Drinking Water," The Spokesman-Review, Spokane, Washington, Nov. 22, 2019, at <https://www.spokesman.com/stories/2019/nov/21/liberty-lake-water-contamination-will-likely-requi/>, 3 pages.

Henderson, et al., "Disaggregating Hot Water Use and Predicting Hot Water Waste in Five Test Homes", U.S Department of Energy, 2014.

Office Action for U.S. Appl. No. 17/127,841, mailed on Sep. 14, 2023, Kann, "Gas Regulator Diaphragm-Position and Pressure-Relief Detection " 14 pages.

Office Action for U.S. Appl. No. 18/195,202, mailed on Dec. 26, 2023, Mark K. Cornwall, "Disaggregation of Gas Load to Determine Meter or Service Under-Sizing", 7 pages.

* cited by examiner

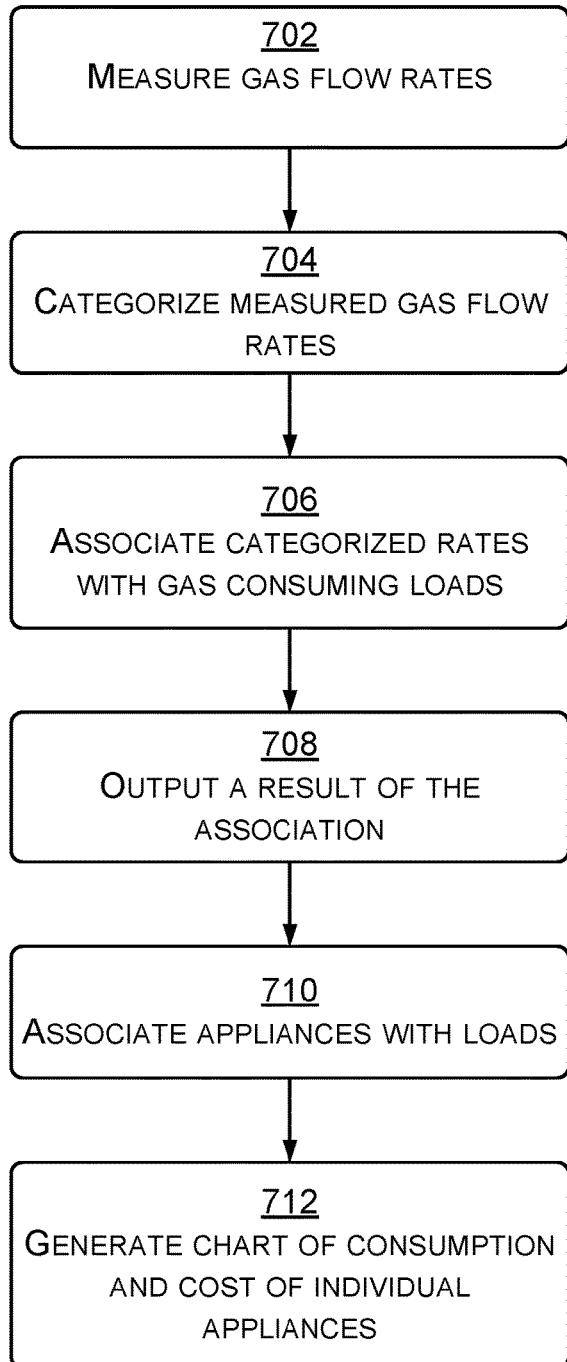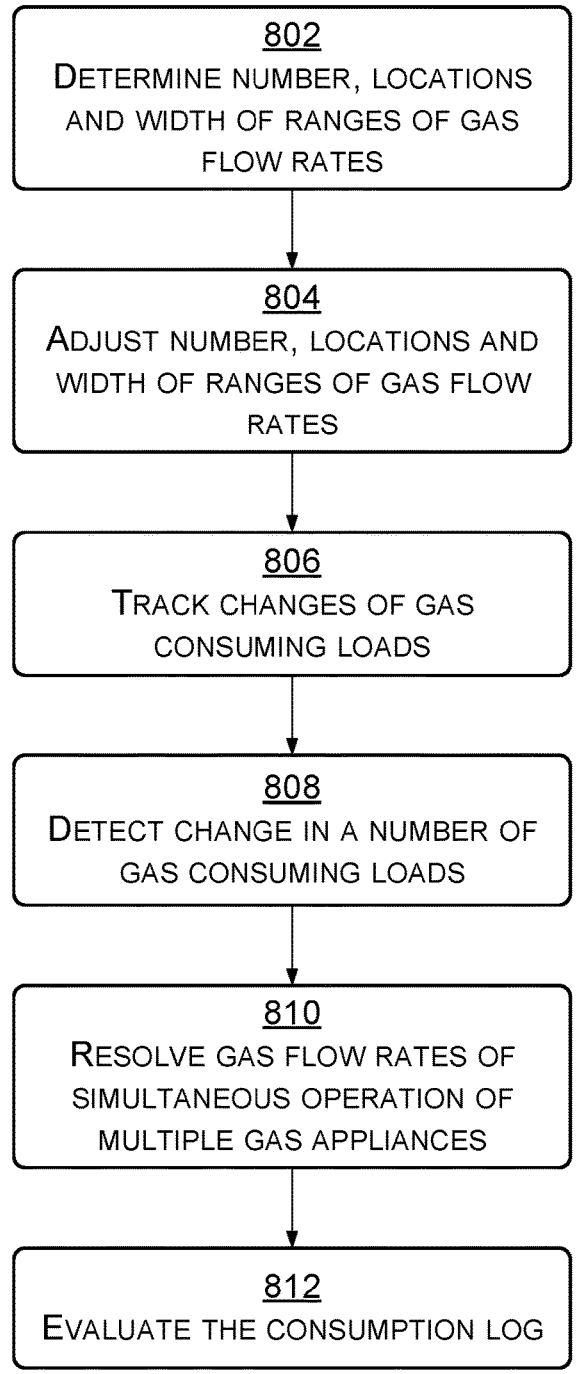
FIG. 7
FIG. 8

DISAGGREGATION OF GAS LOAD TO DETERMINE GAS APPLIANCE PERFORMANCE

RELATED APPLICATIONS

This application is a continuation of and claims priority to U.S. patent application Ser. No. 17/127,678, filed Dec. 18, 2020, titled "Disaggregation of Gas Load to Determine Gas Appliance Performance," the entirety of which is incorporated herein by reference.

BACKGROUND

Smart metering devices (e.g., in the electrical, gas, water and other utility industries) provide substantial information, which may be used to improve the performance and/or economy of many systems, networks, smart meters, appliances and/or other devices. However, in many instances, the cost of sensors and the age of utility delivery systems has resulted in less information than is desirable.

In a first example, there is no easy way for a residential customer to identify a gas-powered appliance that is not operating at full efficiency. Over time, gas appliances may begin to use more gas. A common example is a gas hot water tank, which ages over time by building up a layer of minerals inside the tank, which lessens the quantity of water that the tank can contain, and acts as a thermal insulator between the flame and the water.

In a second example of insufficient information, customers may add additional appliances to their service sites (e.g., home and businesses) as part of a transition from electricity to gas or as part of an increase in standard of living or size of family. Accordingly, the service capacity at the customer site may become under-sized. In many cases, this condition is not recognized by the customer or utility company.

In a third example of insufficient information, an area or region of a gas supply system may experience a low gas-pressure condition (e.g., due to peak consumption). Due to the lack of sensors, the low gas-pressure condition may not be recognized.

Without sufficient information, utility providers cannot accurately diagnose or remedy these or other conditions associated with utility delivery systems.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIG. 7 illustrates an example method of accumulating consumption data indicating consumption of individual loads.

FIG. 8 illustrates a further example method of accumulating consumption data indicating consumption of individual loads.

DETAILED DESCRIPTION

Overview

The disclosure describes techniques for obtaining and processing information from a gas (or other type) of utility network. In a first example, gas usage levels for fixed-rate-consumption gas-powered appliances are obtained. The information is processed to determine if the appliances are operating at full efficiency. The processing may include comparison to historical usage to determine if the appliance(s) is using more gas. Environmental factors, such as air temperature and time of year are monitored so that gas usage can be normalized, and appliance characteristics can be determined.

In a second example, gas usage levels for fixed-rate-consumption gas-powered appliances are obtained. The information is processed to identify if a service capacity at the customer site has or may become under-sized. In many cases, this condition is not recognized by the customer, but may be determined at least in part because a peak gas-usage rate is consistently less than a rate associated with simultaneous operation of all gas appliances.

In a third example, gas usage levels for fixed-rate-consumption gas-powered appliances are obtained. In the example, a metrology device measures fixed-rate-consumption of gas-powered appliances at rates below their fixed usage rates. The low consumption of fixed-rate-consumption devices may result from a low gas-pressure condition. This low gas-pressure condition may be further confirmed based on detection of the same or similar condition by a group of metering devices within a region of a gas supply system supplied by a particular gas main, feeder, trunk, manifold, line, tank, or other common source. Such a condition may be addressed by techniques to re-pressurize appropriate portions of the gas supply network, fix leaks, and/or provide gas at greater rates.

In an example, data acquisition steps are performed by device(s) that are specialized to measure fluid flowrates. In particular examples, the time between reed switch closures and/or the generation and/or timing of an ultrasonic pulse transit are performed by specialized devices (e.g., timers, processors, etc.). Accordingly, these functions are "concrete" actions, involving mechanical actions (e.g., switch closures and pulses), and not abstract concepts. Similarly, disaggregation and historic comparisons are too complex to be performed by a human in a timely manner.

When the techniques discussed herein are performed locally, such actions decrease the amount of traffic over the network (thereby increasing network performance). Such a network and/or systems are therefore more efficient, conserve battery power (less traffic means less repeated messaged, etc.).

Accordingly, the techniques described herein allow utility systems to recognize and compensate for conditions such as degrading appliances, under-sized gas services, and/or regions of low gas pressure without the need for additional sensors throughout the distribution network.

Example Networks, Systems and Techniques

Figure 1:
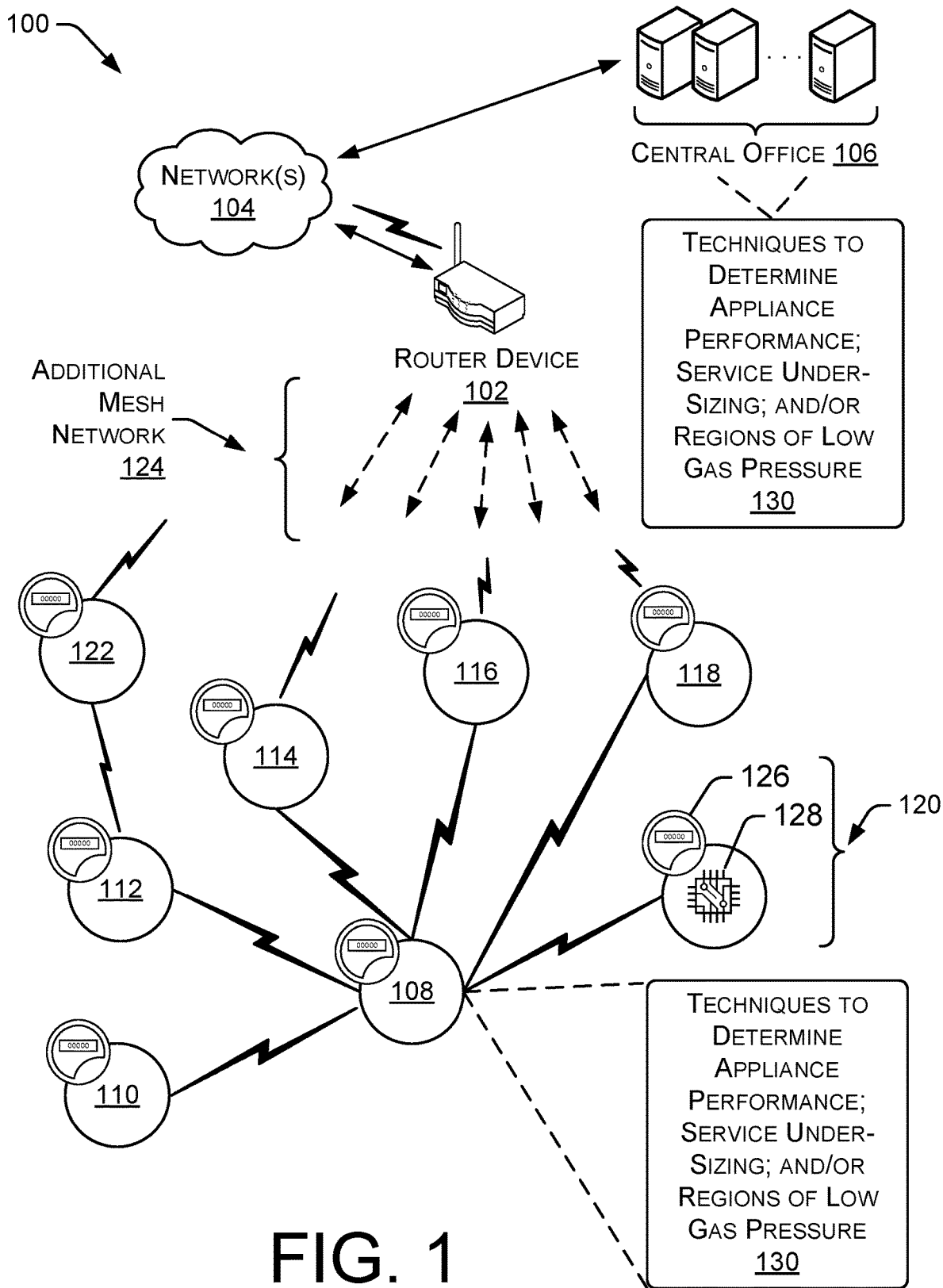
FIG. 1 is a diagram showing portions of an example utility service such as gas or water, etc., and network of metering devices configured for metrology, data transfer, data processing, and/or other functionality.

FIG. 1 shows portions of an example system 100, comprised of portions of a gas-supply system and portions of a communications network. In example systems, the topology of the communication networks may or may not match or directly correspond to the topology of the distribution networks. In one example, portions of a gas supply system may use portions of a communication network of an electrical or water supply system. The gas supply system may include gas supply equipment, gas pipes for gas transport, metering at each customer site, valves and other control devices and control circuitry, as required. The communication network may include a plurality of nodes, some of which are in communication with one another. A node may be part of a communications system associated with a gas supply system, and may include a one- or two-way radio, a processor, memory and/or other components. At least some nodes may be associated with a device of a gas supply system, such as a gas meter. In some examples, the communication network may be comprised of one or more individual networks (e.g., mesh networks, star networks, etc.). FIG. 1 illustrates an example in which the nodes are organized in one or more mesh networks.

In the example, a root node (e.g., the router device 102) may be in radio frequency (RF) communication with one or a plurality of nodes in the mesh network. The router device 102 may communicate, via one or more networks 104 (e.g., wired or wireless, such as a cellular or RF connection), with a central office having a server 106 (e.g., remote from the nodes 108-122), which may include one or more computing devices, such as servers associated with a utility company, or servers having a role in managing, owning, providing, or using the communication network and the nodes and devices of, and/or associated with, that network. In some examples, a server 106 in the central office may manage many networks, and may use one or more router devices to communicate with devices in each network. Examples of such networks may include older and newer nodes, which may use different technologies.

In the example of the communications network, a node (e.g., node 108) has a plurality of one-hop neighbors (e.g., nodes 110-120), each of which may be connected to a same or a different gas supply pipe. In the example, the network of the example system 100 may be a mesh network, including a plurality of devices that relay information upstream and downstream, such as between a router device and a plurality of nodes using parent nodes to relay data for child nodes.

The node 108 is part of the mesh network of the example system 100. In the example shown, the node 108 is the parent node to a child node 110 that is downstream from the node 108. That is, child node 110 depends on its parent, node 108, to relay messages upstream (e.g., to the router device 102) and downstream (e.g., from the router device 102).

In the example shown, a plurality of one-hop upstream neighbors to node 108 are shown, including nodes 112-120 which are reached by "one hop" through the RF mesh network. Node 110 (a child of node 108) is a one-hop neighbor but is downstream of node 108. While nodes 112-120 are shown as one-hop upstream neighbors of node 108, the number of one-hop upstream neighbors for any node may be fewer or much larger, depending on network layout, geometry, RF conditions, etc. Accordingly, the example of FIG. 1 is for purposes of illustration and explanation and is not intended to convey any limitations to the systems and/or techniques described.

A region of additional mesh network 124 of the mesh network of the example system 100 is representative of a potentially large number of nodes. The nodes may be configured to relay data upstream and downstream for the nodes 108-122 that are located downstream of the additional mesh network 124. While not all nodes are shown individually, the mesh network may have many hundreds or many thousands of nodes, and the drawings shown are accordingly simplified to better convey the illustrated concepts.

Figure 2:
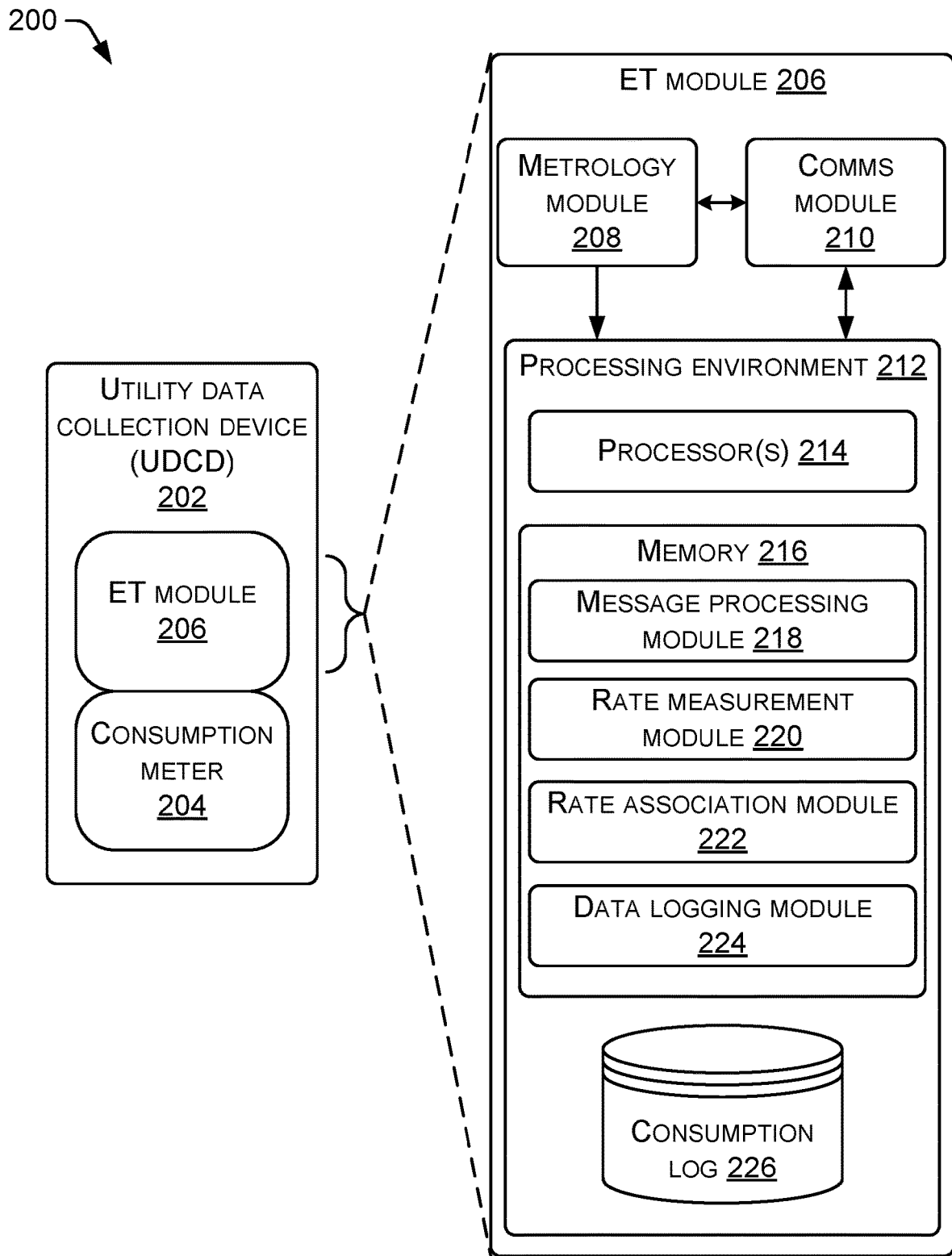
FIG. 2 is a schematic diagram of an example utility data collection device for associating gas flowrates with gas consuming loads.

In some examples of the network of the example system 100, each node may contain various components. In the example of node 120, a metrology device 126 and a data processing component 128 are representative of such components. The metrology device 126 may be solid-state, and may calculate gas flowrate in part from the input of an ultrasonic sensor, transducer or other device. The metrology device 126 may be mechanical, and upon measurement of a unit-volume of gas may close a switch or send a signal. An additional example of such components is shown in FIG. 2. The data processing components of some or all of the nodes in the network may be configured to include modules for enablement of various purposes and techniques 130. Example purposes and techniques 130 include: gas appliance performance calculations; gas service sizing and undersizing calculations; and/or low gas pressure calculation and determination.

Example Disaggregation of a Gas Flow

Existing gas meters may totalize gas usage over a period of time, such as per hour or per month, and record this usage as an hourly or monthly total consumption amount. However, such meters fail to provide instantaneous consumption information and fail to associate consumption with individual consuming appliances.

The techniques described herein for gas flowrate determination may be implemented by an enhanced or smart gas meter (e.g., an endpoint), central/headend office or other location. The techniques may accumulate gas usage information and determine various consumption rates associated with gas consuming loads (e.g., fixed-rate consumption gas appliances). As an example, an enhanced gas meter measures gas flowrates, categorizes the measured gas flowrates, associates the categorized gas flowrates with gas consuming loads and/or appliances and outputs a result to include gas consumption data with the gas consuming loads. In this example, gas flowrates of individual gas consuming loads and gas flowrates indicating simultaneous operation of multiple individual gas consuming loads may be recognized. Gas consuming appliances (e.g., gas water heater, gas furnace) may be associated with gas consumption so that a consumer may track a total consumption or a total cost of operating individual appliances over a measurement period.

Various gas consuming appliances, such as a furnace or water heater, use an approximately constant rate of gas while they operate. Other gas consuming appliances, such as a stove, electrical generator, or clothes dryer, may use a variable rate of gas depending on a number of burners in operation and/or a degree flowrate to the respective burners (in the case of the stove), a size of an electrical load being supplied (in the case of the generator), or a temperature setting (in the case of the clothes dryer). Pilot lights have a relatively low but constant rate of gas consumption. By recording an amount of gas used at various consumption rates, information may be extracted that indicates how much gas is used by individual gas appliances.

A usage profile may be collected, such as by a utility company, and made available to a customer via a web site, an application, an in-home display, on a monthly bill, or the like. As an example, a customer or utility company may associate each gas consuming appliance with accumulated gas flowrate data. A customer may then monitor estimated costs associated with individual gas consuming appliances as well as usage changes over time of individual gas consuming appliances. As an example, a customer may discover that a water heater is consuming more gas than was normal in the past, which may be attributable to a calcium build-up in the tank of the water heater. As another example, a consumer may discover that a gas furnace is consuming more gas than was normal in the past, which may indicate that the furnace needs servicing. A chart, table, graphic, or other information may be provided to a customer indicating how individual gas appliances contribute to total overall gas consumption.

In some examples, the flowrate of gas may be disaggregated based at least in part on historical data. In an example, the historical data may indicate a change in gas consumption of an appliance over time, such as due to an ageing process of a hot water tank. By recognizing and/or anticipating the degradation, a disaggregation algorithm may more quickly recognize the appliance as a fixed-rate consumer of gas. Accordingly, disaggregating the flowrate of gas may include the use of historical gas usage data and/or recognizing fixed-use appliances from previous disaggregation processes, even when the appliance has experienced a change in gas consumption over time. Such use of historical data may speed the disaggregation process. Recognition of the gradual changes of gas use by fixed-rate of consumption appliances may also speed the disaggregation process.

Example Environments for Disaggregation of a Gas Flow

FIG. 2 is a schematic diagram of example architecture 200 of a utility data collection device for associating gas consumption and/or gas flowrates with gas consuming loads and/or gas appliances. As shown in example architecture 200, utility data collection device (UDCD) 202 (e.g., a smart utility gas meter) includes a consumption meter 204. As an example, consumption meter 204 may provide a signal or other data indicating measurement of a specific quantity of gas. The signal may also indicate a specific meter type or other information. Consumption meter 204 may be a mechanical rotary meter to include a residential or commercial diaphragm meter, an electro-mechanical meter, or any other type of meter that measures flow quantity (e.g., consumption quantity) over time, and provides corresponding consumption data.

Encoder-transceiver (ET) module 206 may be configured to process consumption data measured by consumption meter 204 and to measure and/or determine flowrates (e.g., gas flowrates). As an example, ET module 206 may be an encoder-receiver-transmitter (ERT®). ET module 206 may connect to, or integrate with, consumption meter 204 via a direct mount, a remote mount, an integrated construction, etc. ET module 206 and consumption meter 204 are shown in FIG. 2 as separate parts of utility data collection device 202 for simplicity of discussion, but could alternatively be combined or remotely connected.

As shown in FIG. 2, ET module 206 contains metrology module 208 for receiving and processing consumption data from consumption meter 204. Metrology module 208 may be configured to convert the consumption data provided by consumption meter 204 to specific units (e.g., cubic feet) and format the consumption data for processing, transmission and/or storage. Metrology module 208 may include memory, one or more processors and one or more modules for processing the consumption data from consumption meter 204.

ET module 206 may also include communications (i.e., comms) module 210. Comms module 210 allows UDCD 202 to communicate with external sources, such as a utility company central office, a mobile wireless meter reading device, a consumer, a user, or the like. Comms module 210 may be configured to format data, such as into frames or data packets associated with one or more communications protocols, and facilitate one-way or two-way communications with external entities. As an example, comms module 210 may include a radio frequency (RF) transceiver and antenna (not shown) to facilitate wireless communications, a power line communications (PLC) transceiver (not shown) for communication via a power line, a direct communication interface, etc. Metrology module 208 and comms module 210 may be communicatively coupled to each other and/or communicatively coupled to processing environment 212.

In the example of FIG. 2, the processing environment 212 is integrated into ET module 206. Processing environment 212 may include one or more processors 214 and memory 216. Memory 216 may comprise computer-readable storage media that includes, but is not limited to, RAM, ROM, EEPROM, flash memory, cache memory, or other hardware storage devices or hardware-based memory technology. Processing environment 212 may include, or be part of, an application-specific integrated circuit (ASIC) or other suitable hardware logic. Memory 216 may store a variety of modules, such as message processing module 218, rate measurement module 220, rate association module 222 and data logging module 224. Separate from, or integrated with memory 216, is consumption log 226 for storing data associated with processing environment 212.

Message processing module 218 processes messages between UDCD 202 and a utility company, consumer, user, or the like. Message processing module 218 may process various configuration commands to configure, for example, ET module 206. Message processing module 218 may be configured to respond to messages or commands to convey information to users. As an example, message processing module 218 may process external messages or commands received by comms module 210, and format data or response messages for transmission using comms module.

Rate measurement module 220 may be configured to process consumption information, such as data received from metrology module 208, to determine various consumption rates (e.g., instantaneous gas flowrates). As an example, rate measurement module 220 is configured to associate a time interval between known amounts of consumption at consumption meter 204, such that consumption rates may be measured over time intervals. Rate measurement module 220 may be configured to process consumption amounts provided by consumption meter 204 via metrology module 208 to determine gas flowrates at consumption meter 204. Rate measurement module 220 may be configured to pass measured consumption rates to rate association module 222.

Rate association module 222 may be configured to categorize measured consumption rates (e.g., gas flowrates) determined or measured by rate measurement module 220. As an example, rate association module 222 may accumulate measured gas flowrates in bins having ranges of gas flowrates that bracket the bins. For example, rate association module 222 may categorize gas flowrates into bins having different ranges, such as 60-80 BTUs, and 80-100 BTUs, etc. As such, rate association module 222 categorizes consumption rates received from rate measurement module 220 into one or more bins, each bin bracketed by a range of consumption rates.

Rate association module 222 may be configured to accumulate gas consumption data at various consumption rates in bins and sum consumption data within each of the various consumption rate bins over a measurement period. For example, the rate association module 222 may sum a total amount of gas used in a range of 80-90 cubic feet per hour (or in a range of 100-110 cubic feet per hour, etc.) over a billing or measurement period. Rate association module 222 may be configured to determine consumption rate trends and configure a number of bins, locations of bins and/or ranges of consumption rates that bracket the bins (e.g., bin distribution). Rate association module 222 may be configured to relate quantities of accumulated consumption data at various consumption rates to associate gas flowrates with gas consuming loads. As an example, rate association module 222 may detect accumulation of consumption data in multiple different bins, and associate the detected accumulation with gas consuming loads based on determining relative amounts of accumulated consumption data.

As an example, rate association module 222 may be configured to detect accumulation of consumption data at a boundary of two adjacent bins, and adjust bins such that the accumulated consumption data is accumulated in a single bin of the two adjacent bins. As another example, rate association module 222 may assign multiple bins of a plurality of bins to accumulate consumption by a consumption load in the assigned multiple bins.

As an example, if a residence has a water heater with a pilot light, a furnace with an electronic ignition, and a gas cooking stove, rate association module 222 may be configured to learn various consumption distribution rates for these gas consuming appliances such that a number of bins, bin sizes (i.e., width or range of consumption rates that bracket the bin) and/or bin locations are configured and adjusted to best accumulate consumption data for each gas consuming appliance. In an embodiment, rate association module 222 evaluates consumption data to optimize bin distribution.

Rate association module 222 may also be configured to optimize (e.g., a size and/or a location of) one or more bins that accumulate gas consumption associated with simultaneous operation of multiple gas appliances. As an example, a water heater may cycle on while a furnace is off, and a furnace may cycle on while the water heater is off. However, at times, both the water heater and furnace may operate simultaneously. In this case, rate association module 222 optimizes a bin location and range of gas flowrates that bracket the bin to accumulate gas flowrates indicating simultaneous operation of both the furnace and water heater while operating simultaneously. In an embodiment, rate association module 222 evaluates consumption data to resolve the contribution of the furnace and the water heater associated with the bin having accumulated gas flowrates indicating simultaneous operation of both the furnace and water heater. This allows for generation of a chart that resolves a total consumption and/or a total cost associated with the simultaneous operation of two or more individual gas consuming loads into constituent individual gas consuming loads.

As another example, if a consumer were to add an additional gas consuming load (e.g., gas appliance), rate association module 222 may re-allocate the distribution of bins to optimize an accumulation of consumption data of the prior and the additional gas consuming appliance(s). As another example, if a consumer were to replace a gas consuming appliance with a new, more energy efficient model that operates in a lower range of gas flowrates, rate association module 222 may re-allocate bin distribution to optimize an accumulation of gas consumption data of the new gas consuming appliance in an associated bin. As another example, if a consumer removes a gas appliance, the rate association module 222 may re-allocate bin distribution to optimize an accumulation of gas consumption data of the existing remaining gas appliances.

As another example, a consumer may have a gas appliance that is designed to operate at a fairly constant gas flowrate, but for some reason, such as a defect, the appliance starts operating at a different gas flowrate. Rate association module 222 is configured to re-allocate bin distribution to track the different gas flowrate of the potentially defective gas appliance. Upon receiving a chart showing this different gas flowrate, a consumer could determine that the gas appliance may have become defective and take appropriate action. Rate association module 222 may be configured to flag that the change has occurred.

Data logging module 224 is configured to store consumption data in consumption log 226. As an example, as consumption at measured gas flowrates are accumulated in bins, data logging module 224 stores the accumulated consumption data in consumption log 226. Data logging module 224 may be configured to format the consumption data, such that the accumulated consumption data associated with bins can be provided in chart form to a utility company, consumer, user, or the like. As an example, data logging module 224 formats the consumption data to facilitate generating a chart showing a total consumption and/or a total cost over a measurement period associated with individual gas consuming appliances. Therefore, a utility company, consumer, user, or the like may access information from consumption log 226 to determine total consumption associated with individual gas appliances.

ET module 206 may include computer-readable media. Computer-readable media may include two types of computer-readable media, namely computer-readable storage media and communications media.

Computer-readable storage media (e.g., memory 216, consumption log 226) includes volatile and non-volatile, removable and non-removable media implemented in any method or technology for storage of information such as computer readable instructions, data structures, program modules, or other data. Computer-readable storage media, such as consumption log 226, includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer-readable storage media does not include communication media.

Figure 3:
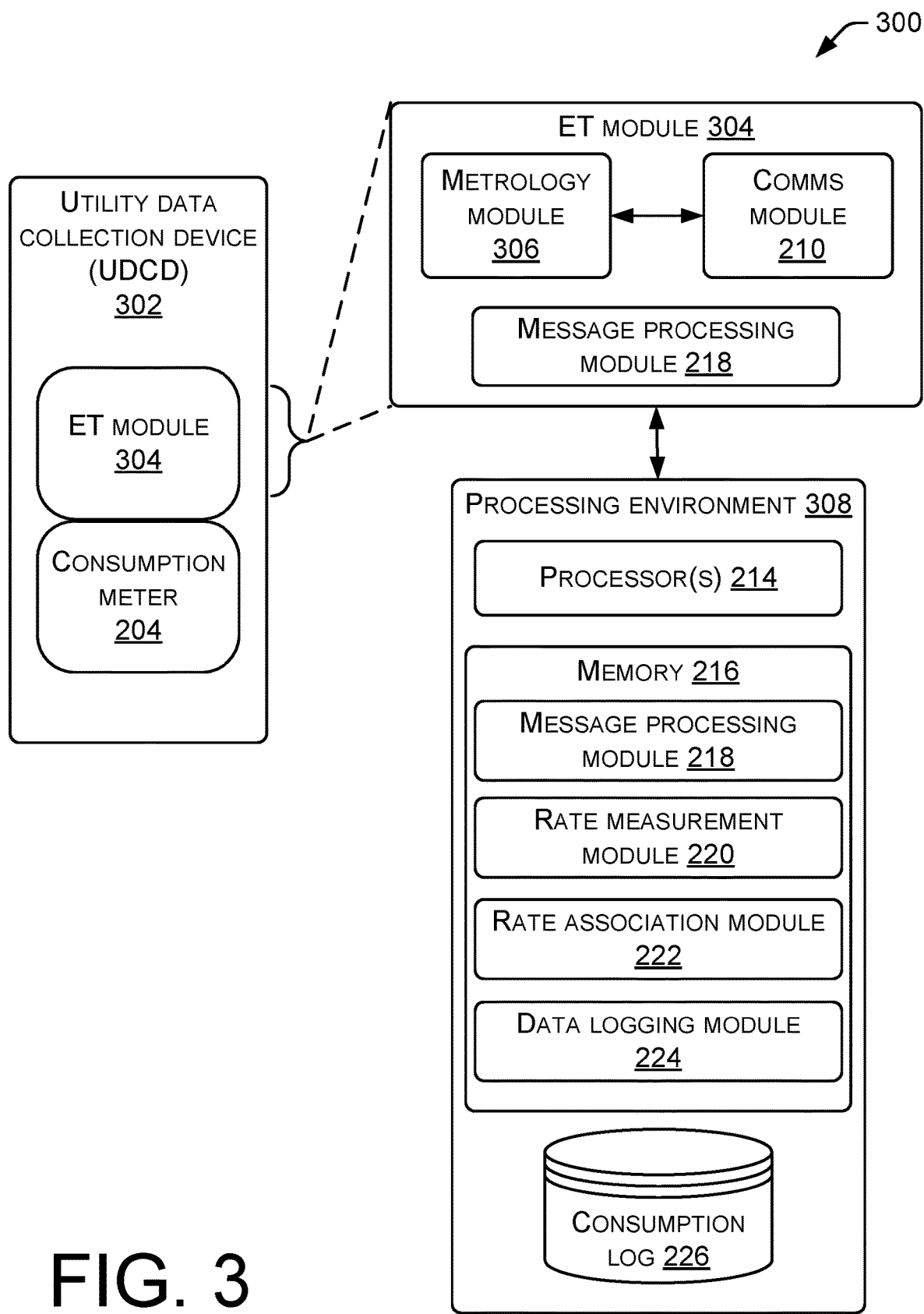
FIG. 3 is a schematic diagram of an example distributed processing environment and a utility data collection device for associating gas flowrates with gas consuming loads.

FIG. 3 is a schematic diagram of example architecture 300 of using a utility data collection device (e.g., smart gas meter) to associate gas flowrates with gas consuming loads in a distributed processing environment. As shown in example architecture 300, utility data collection device (UDCD) 302 (e.g., a smart utility meter) includes consumption meter 204, as described with respect to FIG. 2 and ET module 304.

ET module 304 includes metrology module 306, comms module 210 and message processing module 218, as described with respect to FIG. 2. Using message processing module 218, ET module 304 may respond to commands to provide consumption data obtained, for example, from consumption meter 204. Metrology module 306 may be configured to convert the consumption data provided by consumption meter 204 to specific units (e.g., cubic feet) and format the consumption data for processing, transmission and/or storage. Metrology module 306 may include memory, one or more processors and one or more modules (not shown) for formatting the consumption data from consumption meter 204. Metrology module 306 may be configured to provide consumption data to processing environment 308. As an example, metrology module 306 may provide consumption data to processing environment 308 using comms module 210 in response to a message request, or at various time durations.

In example architecture 300, processing environment 308 is shown as separate from ET module 304. Processing environment 308 may include a distributed processing environment in direct or indirect communication with UDCD 302, such as via comms module 210. As an example, processing environment 308 may be located at a utility company central office, or distributed among multiple offices or other locations. Processing environment 308 is shown in FIG. 3 to have components including processor(s) 214, memory 216, message processing module 218, rate measurement module 220, rate association module 222, data logging module 224 and consumption log 226, as described with respect to FIG. 2. Various components of processing environment 308 may be located in ET module 304. As an example, metrology module 306 and/or ET module 304 may contain some or all of the functionality associated with rate measurement module 220, as well as data logging module 224 and consumption log 226.

Thus, processing environment 308 may be configured to provide functionality comparable to the functionality provided by processing environment 212, described herein with regard to FIG. 2.

Example Bin Allocation of Consumption Rates

Figure 4:
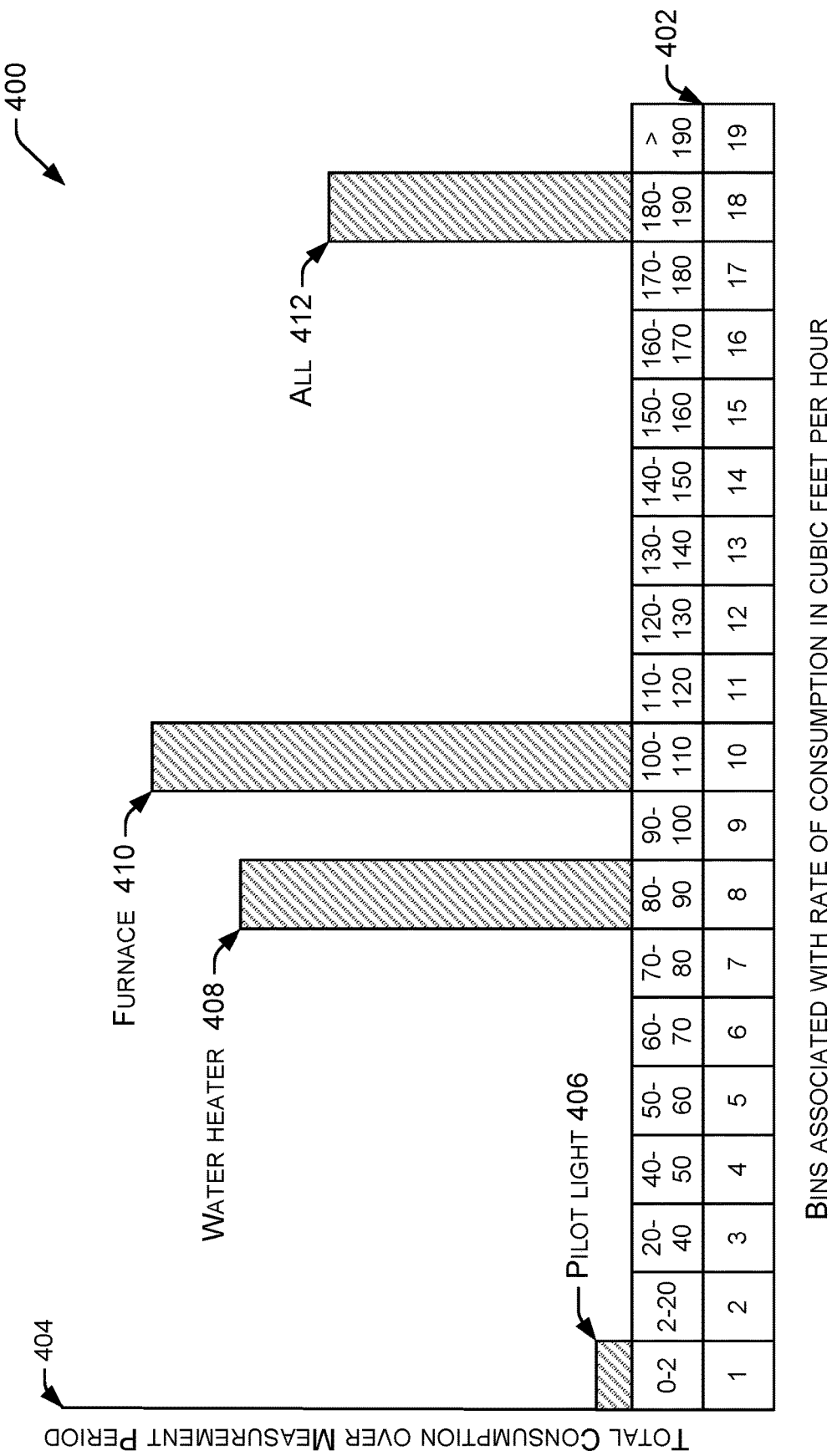
FIG. 4 is an example chart showing bins and bin allocations of various consumption rates associated with various gas consuming appliances.

FIG. 4 is a diagram showing an example chart 400 of a distribution of bins and bin allocations at various consumption rate ranges. The horizontal x-axis 402 illustrates example bins 1-19 associated with various ranges of consumption rates. The vertical y-axis 404 measures accumulated consumption data over a measurement period, such as a day, a month or the like. As illustrated in FIG. 4, bin 1 is bracketed on x-axis 402 by a range of consumption rates of 0-2 cubic feet per hour. In the context of the example of FIG. 2, rate measurement module 220 detects a consumption rate of gas in the range of approximately 0.25 cubic feet per hour, where rate association module 222 allocates that consumption rate to bin 1 that brackets 0.25 cubic feet per hour with a range of consumption rates of 0-2 cubic feet per hour. As an example, bin 1 may be associated by a consumer, utility company or third-party entity with a pilot light 406. Thus, rate association module 222 accumulates consumption data that falls in the range of 0-2 cubic feet per hour. This data may be summed to measure a total accumulated consumption over a measurement period, as illustrated by the height of pilot light 406 as measured on y-axis 404. Additionally, rate association module 222 may store data associated with an amount of gas consumed in the bin 1 range of 0-2 cubic feet per hour over a measurement period within the consumption log 226.

As illustrated in example chart 400, bin 8 is associated with a range of consumption rates of 80-90 cubic feet per hour of gas. In a similar aspect to bin 1, rate measurement module 220 detects a consumption rate in the range of 80-90 cubic feet per hour, and rate association module 222 accumulates the associated consumption rate data in bin 8. The consumption associated with bin 8 may be attributable to gas water heater 408. As an example, water heater 408 has pilot light 406. Therefore, since water heater 408 consumes gas at a substantially constant rate when it is cycled on, rate association module 222 accumulates the amount of gas consumed over time in bin 8.

Bin 10 is illustrated in FIG. 4 as associated with a range of consumption rates of 100-110 cubic feet per hour. In the example of FIG. 1, rate association module 222 accumulates the amount of gas consumed within a range of consumption rates of 100-110 cubic feet per hour, which may be displayed in bin 10. The accumulated amount of gas consumed in bins is measured along y-axis 404. As an example, gas consumption occurring within a consumption rate associated with bin 10 may be associated with gas furnace 410.

Bin 18 is illustrated in FIG. 4 as associated with a range of consumption rates of 180-190 cubic feet per hour. In the example of FIG. 1, rate association module 222 accumulates the amount of gas consumed within a range of consumption rates of 180-190 cubic feet per hour, which may be displayed in bin 18. The total amount of gas consumed as accumulated in bin 18 is measured along y-axis 404. As an example, gas consumption occurring within a consumption rate associated with bin 18 is associated with pilot light 406, water heater 408 and gas furnace 410 running simultaneously as all gas-consuming and/or operating appliances 412.

Rate association module 222 may be configured to resolve all consuming appliances 412 into constituent individual gas-consuming loads. As an example, based on a relative analysis of total consumption on y-axis 404 of pilot light 406, water heater 408 and furnace 410, rate association module 222 may be configured to resolve all consuming appliances 412 into constituent components of pilot light 406, water heater 408 and furnace 410. Other bins (e.g., 2-7, 9, 11-17 and 19) are associated with ranges of corresponding consumption rates as shown on x-axis 402 where no appreciable consumption data has been accumulated.

Figure 5:
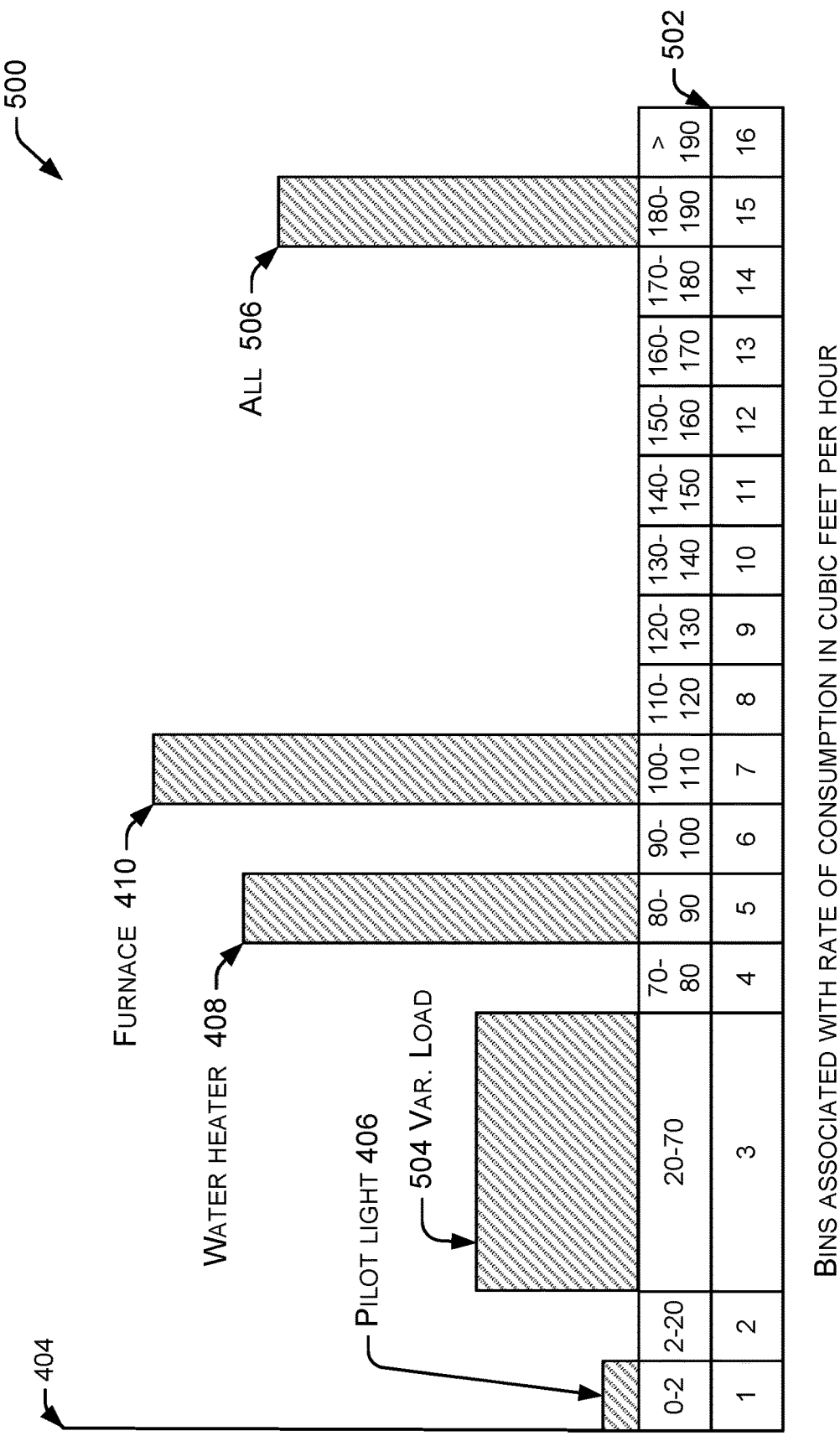
FIG. 5 is an example chart showing bins and bin allocations of various consumption rates associated with various fixed and variable consumption gas appliances.

FIG. 5 is a diagram showing an example chart 500 of a distribution of bins according to various consumption rate ranges. Vertical y-axis 404, as shown in FIG. 4, measures total consumption associated with each bin. Horizontal x-axis 502 illustrates bins 1-16 associated with various ranges of consumption rates. In a manner that differs from example chart 400 of FIG. 4, FIG. 4 illustrates a different bin allocation or distribution along x-axis 502. In one example difference, bin 3 is associated with a consumption rate of 20-70 cubic feet per hour.

Rate measurement module 220 may detect consumption of gas at variable consumption rates in the range of 20-70 cubic feet per hour associated with a variable gas consuming appliance, such as a gas cooking stove 504. The rate association module 222 may accumulate these variable consumption rates over bins 3-6 of FIG. 4, and data logging module 224 stores these variable consumption rates in consumption log 226. A utility, consumer, third party entity, or the like, may then analyze this data and recognize that it results from an appliance having variable gas rate consumption. Having recognized the nature of the consumption, the bins may be reorganized or adjusted as shown in FIG. 5.

As an example, a utility, consumer, third party entity, or the like, may send a command to ET module 206 or 304 to allocate bins as shown in FIG. 3. As another example, rate association module 222 may be configured to analyze data in consumption log 226 to learn that these variable consumption rates are persistent. As such, rate association module 222 may reallocate bins on x-axis 402 to create a new bin 3, as shown in FIG. 4, associated with consumption rates of variable gas consuming appliance 504. Additionally, rate association module 222 may be configured to vary other bins on x-axis 502. As an example, rate association module 222 varies other bins on x-axis 502 based on an analysis of consumption data or observed consumption rates from rate measurement module 220. Rate association module 222 may widen or narrow a width of consumption rate ranges in bins to better capture consumption at consumption rates of individual appliances with corresponding bins. In one example, a comparison of FIGS. 3 and 4 shows a consolidation of various bins. As another example, based on evaluated or observed consumption rates, rate association module 222 may merge unused bins 9-13 on x-axis 402 into a single bin. As required, rate association module 222 may allocate any number of bins and any range of consumption rates (e.g., widths) of bins. If a consumer acquires a new gas consuming appliance that consumes gas according to a range of bin 11 (i.e., 140-150 cubic feet per hour), rate association module 222 accumulates consumption data associated with bin 11, and may merge unused bins 8-10 and bins 12-14 into individual respective bins.

FIG. 5 shows that bin 15 is associated with a consumption range of 180-190 cubic feet per hour. In the example of FIG. 2, the rate association module 222 measures the amount of gas consumed within a range of 180-190 cubic feet per hour over time in bin 15. The current total amount of gas consumed in bin 15 is measured along y-axis 404. FIG. 5 shows that gas consumption within a consumption range associated with bin 15 results from simultaneous operation of pilot light 406, variable gas consuming appliance 504, water heater 408 and gas furnace 410. Other bins (e.g., 2, 4, 6, 8-14 and 16) are associated with ranges of corresponding consumption rates as shown on x-axis 402. FIG. 5 shows only one bin, bin 15, used to accumulate all simultaneous consumption. However, depending on the number of individual gas consuming loads, as well as their consumption rates, rate association module 222 may allocate multiple bins representing simultaneous consumption of other combinations of various gas consuming loads. As another example, due to the variability of variable gas consuming load 504, rate association module 222 may determine to not include variable gas consuming load 504 in all consuming and/or operating appliances 506 running simultaneously.

Based on the loads that the rate association module 222 determines to include in all consuming appliances 506 running simultaneously, rate association module 222 may be configured to resolve which amount of consumption along axis 502 is attributable to each consuming load. As an example, rate association module 222 may be configured to indicate what percentage of all gas-consuming loads 506 running simultaneously is attributable to each of the pilot light 406, the water heater 408 and the furnace 410. Thus, rate association module 222 may be configured to resolve all consuming loads 506 into constituent individual gas consuming loads, to indicate portions attributed to loads 406, 408 and 410.

Figure 6:
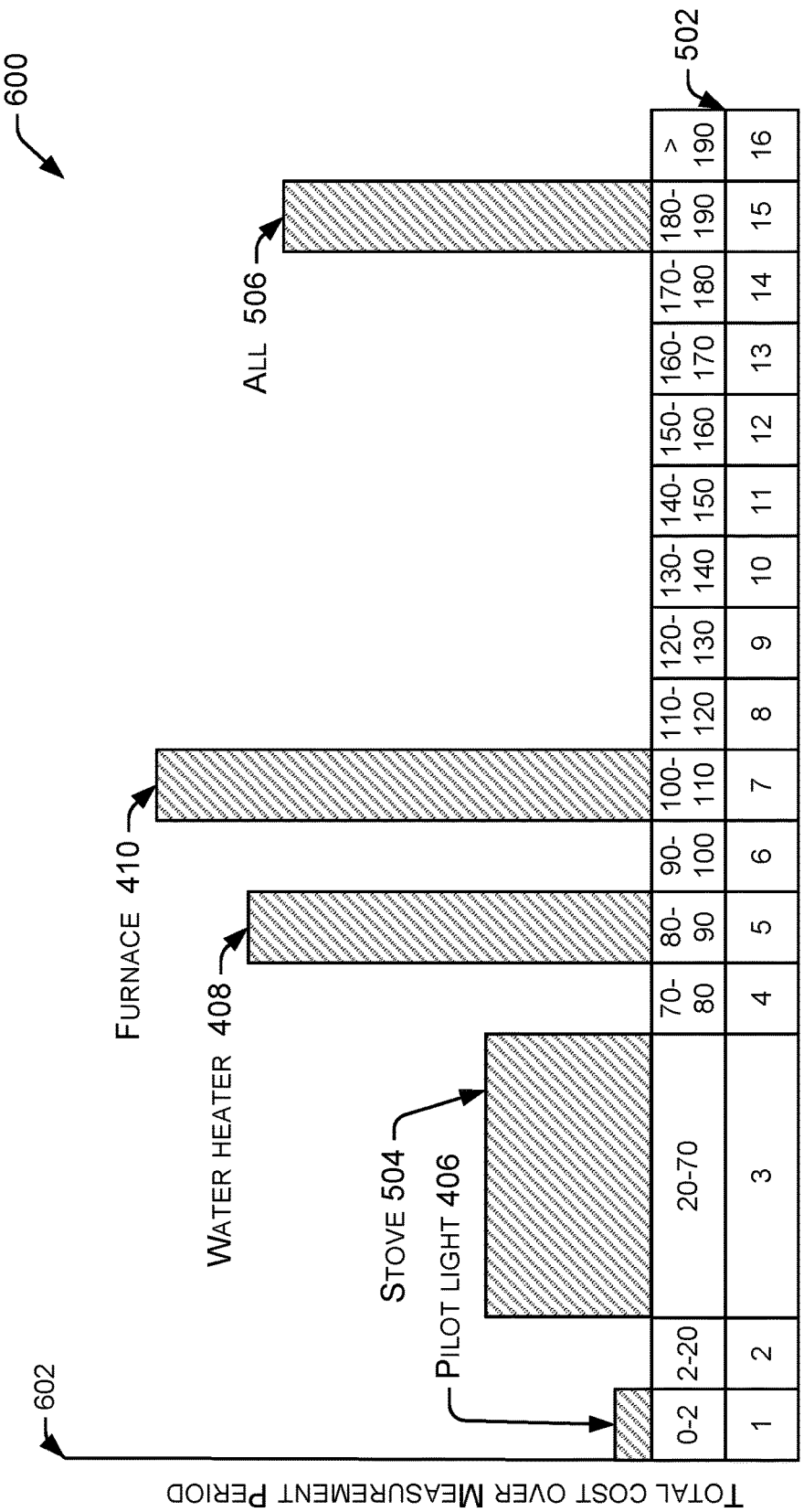
FIG. 6 is an example chart showing total accumulated costs associated with various gas consuming appliances.

FIG. 6 is a diagram showing an example chart 600 of total accumulated costs on axis 602 associated with various gas consuming appliances. Chart 600 represents a usage profile collected by the utility and made available to the customer through a website, a printed bill or invoice or an in-home display. An appliance may be associated with each step of the flowrate, such as pilot light 406, stove 504, water heater 408, furnace 410, and simultaneous usage 506 by a homeowner, utility company, user, etc.

As an example, a 100,000 BTU furnace uses gas at a rate of 100 cubic feet per hour. A 65,000 BTU stove uses gas at a variable rate of 25-65 cubic feet per hour. An 80,000 BTU water heater uses gas at 80 cubic feet per hour. A pilot light uses 0.25 cubic feet per hour. FIG. 6 shows an example of how consumption in cubic feet as well as cost can be displayed for a home with a water heater with a pilot light, a gas stove and a furnace with electronic ignition.

Consumption log 226 may store additional information for use by a utility, consumer, third-party entity, or the like. As an example, consumption log 226 may contain data that associates time-of-day with distinct consumption rates (e.g., pilot light 406, water heater 408, furnace 410 and combination 506) such that data may be presented to a user on example chart 500 indicating various times of day that various gas consuming appliances consumed gas.

FIGS. 4-6 show examples of use of a single bin to show an amount of gas consumed at different rates. In an alternative, the rate association module 222 may allocate two or more bins to accumulate consumption for one or more of pilot light 406, stove 504, water heater 408, furnace 410 and all simultaneous consumption 506. As an example, in the alternative, bins 1-19 shown in FIG. 4 may each include multiple bins, such as 5 or more sub-bins. Rate association module 222 may be configured to select a number and location of sub-bins to adjust a number, location and width of bins associated with x-axis 402 in FIG. 4.

Example Methods for Determining Consumption Rates

FIG. 7 illustrates an example method 700 of determining gas consuming loads associated with various consumption rates. Method 700 is described with reference to the example architecture 200 of FIG. 2 for convenience. However, method 700 is not limited to use with the example architecture 200 of FIG. 2 and may be implemented using other architectures and devices, such as example architecture 300 shown in FIG. 3.

Method 700 begins at block 702, with measuring gas flowrates. As an example, rate measurement module 220 measures gas flowrates at consumption meter 204.

At block 704, the measured gas flowrates are categorized according to one or more levels or gas flowrate ranges. In one example, the rate association module 222 of FIGS. 2 and 3 categorizes gas consumption at measured gas flowrates into corresponding bins. In the example, the rate measurement module 220 may measure a rate of 85 cubic feet/hour and rate association module 222 may categorize the measured gas flowrate with bin 5 in FIG. 5, which is bracketed by gas flowrates of 80 and 90 cubic feet/hour, such that bin 5 has a width of gas flow ranges of 10 cubic feet/hour. Rate association module 222 thus accumulates consumption of gas (e.g., records data) around 85 cubic feet/hour in bin 5 in FIG. 5. Thus, rate association module 222 accumulates consumption data at the measured gas flowrates in bins having ranges of gas flowrates that bracket the bins, such that the categorizing the measured gas flowrates comprises associating the measured gas flowrates with ranges of gas flowrates. As an example, rate association module 222 may categorize gas flowrates of individual gas consuming appliances and gas flowrates of simultaneous operation of two or more of the individual gas consuming appliances into corresponding ranges of gas flowrates.

At block 706, categorized gas flowrates are associated with gas consuming loads. As an example, based on detecting a quantity of gas consumed by a gas consuming load at a rate of about 85 cubic feet/hour, rate association module 222 may determine that bin 5 in FIG. 5, having a range of gas flowrates of 80-90 cubic feet/hour, is associated with the gas consuming load. As another example, based on a quantity of gas consumed around 105 cubic feet/hour, rate association module 222 may determine that bin 7 in FIG. 5 is associated with a gas consuming load. Rate association module 222 may then determine that a quantity of gas consumed around 185 cubic feet/hour is associated with bin 15 in FIG. 5 and is attributable to simultaneous operation of consuming loads 408 and 410 in FIG. 5. Therefore, rate association module 222 recognizes gas flowrates of individual gas consuming loads and gas flowrates indicating simultaneous operation of at least two of the individual gas consuming loads.

At block 708, a result of the associating the categorized gas flowrates with gas consuming loads may be output. As an example, the result output includes accumulated gas flowrate data associated with the gas consuming loads. As another example, the result includes accumulated consumption at gas flowrates of individual gas consuming loads and accumulated consumption at gas flowrates indicating simultaneous operation of two or more of the individual gas consuming loads, accumulated in a plurality of bins or ranges of gas flowrates. As an example, the result may include usage data such that the usage data of at least two of the gas consuming appliances includes data obtained while at least two gas consuming appliances were simultaneously operational.

The result of data associated with consumption accumulated in bins over a measurement period, such as illustrated in FIGS. 4-6, may be output. In the context of the example of FIG. 2, message processing module 218 may receive a command from a utility company, consumer, or the like, to provide accumulated consumption data in bins. In response to the command, data logging module 224 may format the data, such that the data is provided for transmission via comms module 210. The ET module 206 may be configured to periodically or a-periodically provide the result of accumulated consumption data in the bins.

At block 710, gas consuming appliances are associated with at least a subset of the gas consuming loads. As such, the categorized gas flowrates may be associated with gas consuming loads that comprise associating the categorized gas flowrates with gas consuming appliances. A user interface may be presented to a consumer, allowing the consumer to associate gas consuming appliances with one or more of the gas consuming loads. As such, an association may be received, through operation of the user interface, of one or more gas consuming appliances with at least one gas consuming load. Alternatively, gas consuming appliances may be associated with one or more of the gas consuming loads based at least in part on known consumption rates of the gas consuming appliances.

At block 712, the result output may be used to generate a chart based at least in part on the result showing total consumption and/or total cost over a measurement period associated with individual gas consuming appliances. As an example, data logging module 224 may be configured to generate the chart associated with individual gas consuming appliances. The chart may resolve total consumption and/or the total cost associated with the simultaneous operation of two or more of the individual gas consuming loads into constituent individual gas consuming loads. As another example, the result output by data logging module 224 may be used by an external entity to generate the chart showing total consumption and/or total cost over a measurement period associated with individual gas consuming appliances that resolves simultaneous operation of the two or more of the individual gas consuming appliances into constituent individual gas consuming appliances. In the case where gas consuming appliances have been associated with gas consuming loads, the charts may be annotated to show consumption of individual gas consuming appliances.

FIG. 8 illustrates an example method 800 to determine gas consuming loads associated with various consumption rates. Method 800 is described with reference to the example architecture 200 of FIG. 2 for convenience. However, method 800 is not limited to use with the example architecture 200 of FIG. 2 and may be implemented using other architectures and devices, such as example architecture 300 shown in FIG. 3.

As an example, bins (e.g., ranges of gas flowrates) used to accumulate consumption data at various consumption rates may be predefined with a default bin distribution, such as illustrated in FIG. 4. During operation, upon determining gas consumption at various gas consumption rates, rate association module 222 may adjust a range of gas consumption associated with one or more bins to better capture consumption at various consumption rates.

At block 802, a number of ranges of gas flowrates (e.g., number of bins) are determined, locations of ranges of gas flowrates (e.g., bin locations) are determined and a width (e.g., bin width) of each of the ranges or gas flowrates are determined. At block 804, bins may be adjusted by rate association module 222 based on the determined number of bins, locations of bins and/or ranges of gas flowrates that bracket each of the bins. In the example of FIG. 4, bins 1-19 may not be aligned or best adjusted to accumulate consumption of pilot light 406, water heater 408, furnace 410 and simultaneous operation of appliances 412. Therefore, rate association module 222 may be configured to change the number of bins, change the location of the bins and change the range of gas flowrates that bracket the bins to best accumulate consumption of pilot light 406, water heater 408, furnace 410 and simultaneous operation of appliances 412.

At block 806, changes of categorized gas flowrates associated with the gas consuming loads are tracked and the categorizing of the measured gas flowrates may be adjusted based on the tracked changes. In the context of the example of FIG. 4, assume that due to a defect or other phenomenon, the rate of gas consumption of water heater 408 changes to be between bins 7 and 8 or bins 8 and 9. In this example, rate association module 222 may be configured to adjust bins to track the changed consumption rate of water heater 408. As an example, rate association module 222 may change a location of bin 8 by shifting it in the direction of the changed consumption rate of water heater 408. As another example, rate association module 222 may remove a bin to widen bin 8 to best accumulate consumption at the changed consumption rate of water heater 408. Rate association module 222 may reduce a range of other bins to account for a shift or widening of the ranges of bin 8. As an example, data logging module 224 may be configured to flag that a consumption rate has changed to alert a consumer.

At block 808, a change in a number of gas consuming loads is detected. As an example, the change in the number of gas consuming loads may be reflected in an output and/or a chart as a changed number of gas consuming appliances associated with gas consuming loads. As an example, rate association module 222 may adjust bins to accommodate a removal or addition of one or more gas consuming loads. Referring again to FIG. 5, assume that variable gas consuming load 504 was newly added. As shown in example FIG. 5, rate association module 222 has reduced the number of bins (relative to FIG. 4) and has changed the range of gas flowrates that bracket or surround bin 3 (e.g., changed the width of bin 3) to best accommodate accumulation of consumption data of variable gas consuming load 504. Therefore, rate association module 222 may be configured to detect a change in a number of the gas consuming loads, and in response to detecting the change in the number of the gas consuming loads, determine at least one of a new number of the bins, new locations of the bins or new widths of ranges of gas flowrates that bracket the bins.

At block 810, the gas flowrates of simultaneous operation of two or more of the individual gas consuming appliances are resolved to indicate consumption by each individual gas consuming appliance. As an example, referring back to FIG. 3, data logging module 224 may log accumulated consumption of pilot light 406, water heater 408, furnace 410 and simultaneous operation of appliances 412 in consumption log 226. Data logging module 224 may be configured to log the accumulated gas flowrates of the individual gas consuming loads and the accumulated gas flowrates indicating simultaneous operation of two or more of the individual gas consuming loads in consumption log 226. Rate association module 222 may evaluate consumption log 226 to resolve the simultaneous operation of two or more of the individual gas consuming appliances to indicate consumption by each appliance and update at least one of a number, a location, or ranges of gas flowrates that bracket the bins of the plurality of bins. Thus, at block 812, rate association module 222 may be configured to evaluate consumption log 226 to perform aspects of the methods described in blocks 802-810 above.

Example Recognition of Appliance Degradation at Service Point

Figure 9:
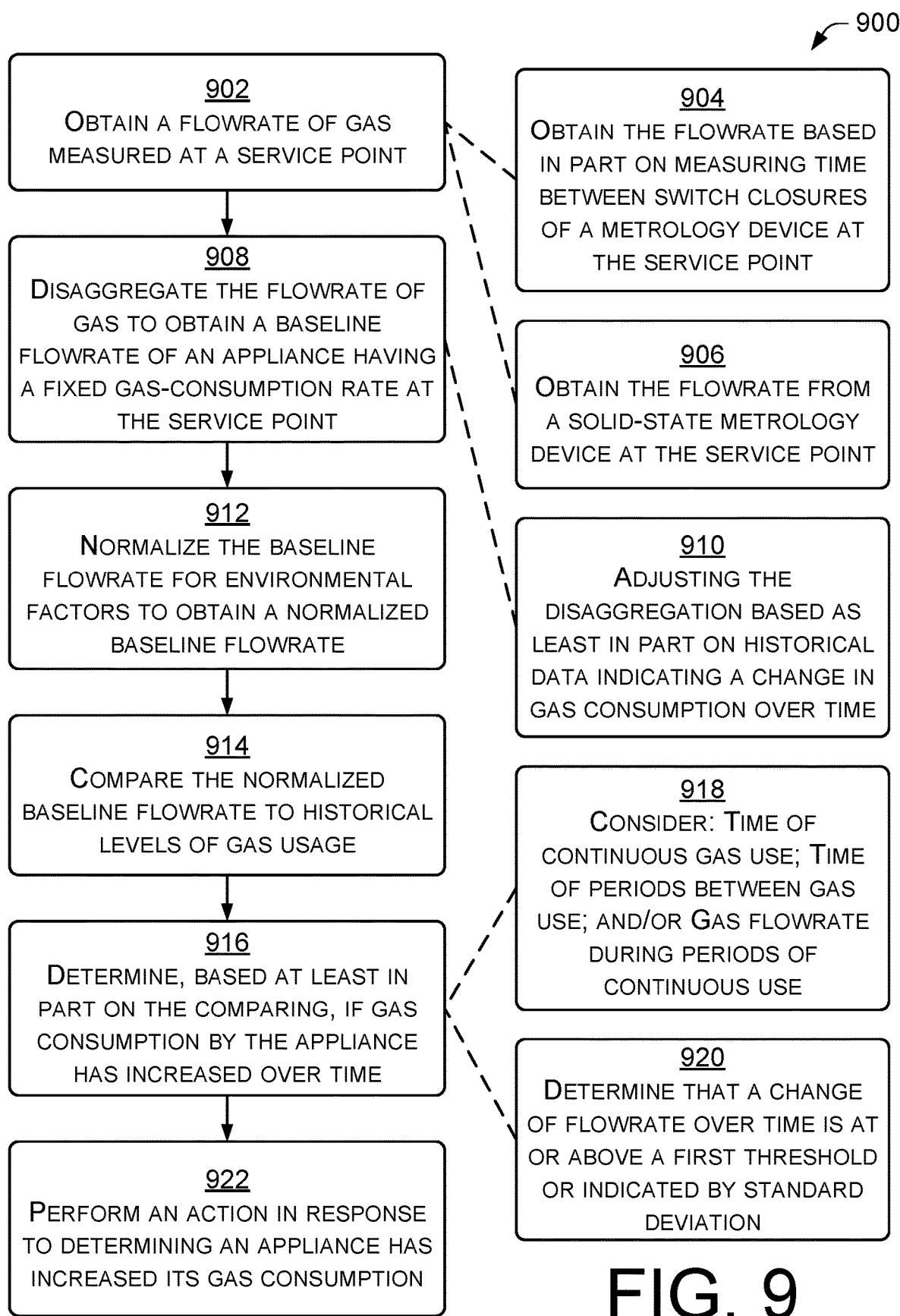
FIG. 9 is a flow diagram showing an example method of determining gas appliance performance.
Figure 9A:
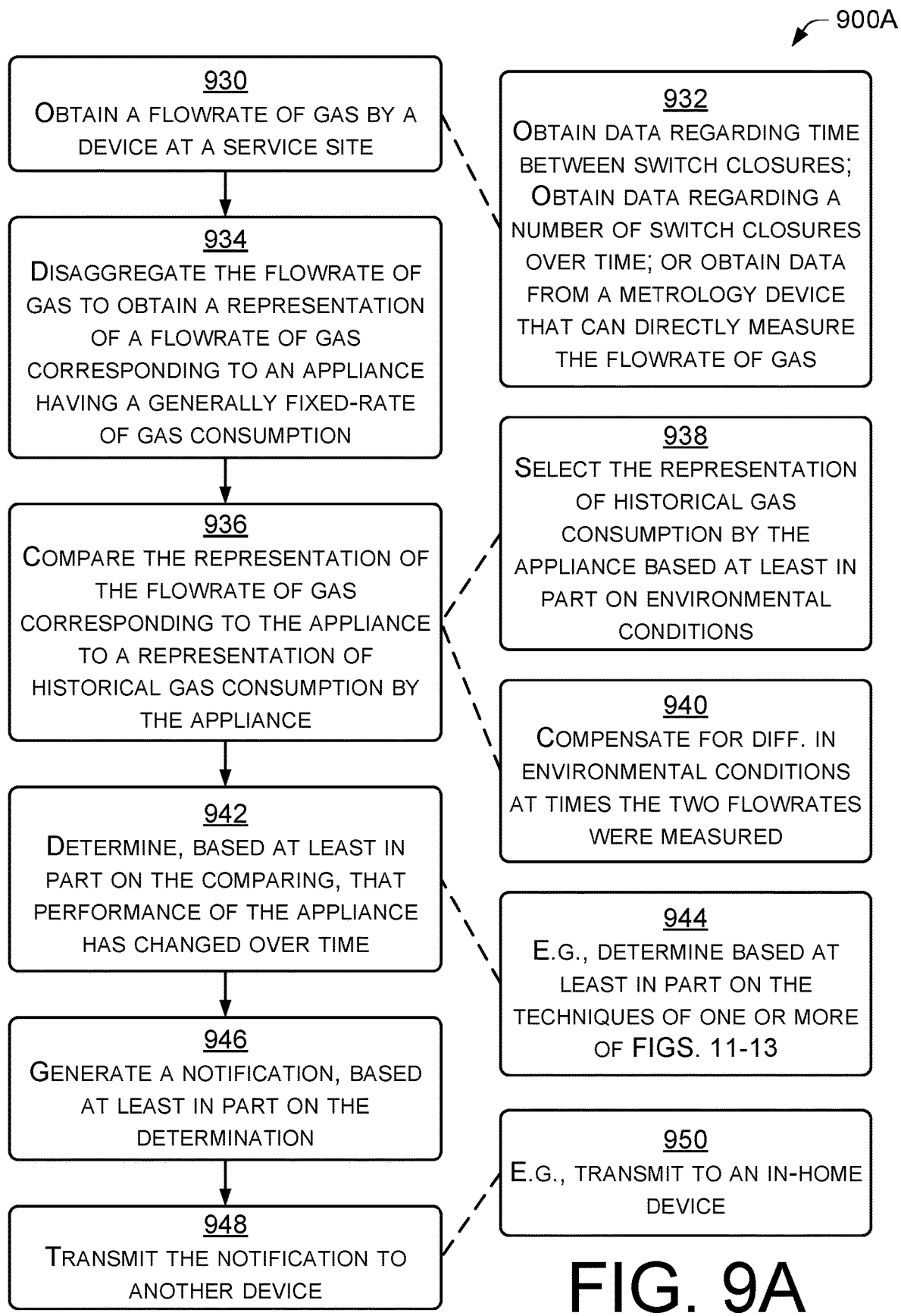
FIG. 9A is a flow diagram showing a second example method of determining gas appliance performance.

FIGS. 9 and 9A shows an example methods 900 and 900A of determining gas appliance performance and/or performance degradation over time. While an order of the blocks of the method is shown, the order of execution may be changed, and blocks may be omitted, without departing from the method as disclosed or claimed. The methods may be performed by any device, such as those having a processor and memory. In several examples, the methods may be performed by a smart gas metering device. The method may be performed by one or more computer devices such as a server 106 within the central office, a cloud-based computing service, or other computing device, etc. Portions of the methods may be performed by a headend device (e.g., the server 106 at the central office), a service point (e.g., node 108) or performed by a combination of these or other devices. In an example, the methods may be performed by execution of software and/or stand-alone or cooperating application(s) running on a smart meter, central office server, and/or other device. In the examples of FIG. 1, the techniques 130 may include and/or be configured as an application able to execute the methods. In the examples of FIGS. 2 and 3, the methods may be performed by software stored in memory device 216 and executed by a processing device and/or processor 214.

Gas appliances may degrade over time, which can result in increased gas consumption. In an example of appliance degradation, a gas-powered hot water tank may acquire a layer of minerals over time. The layer may tend to insulate water in the tank from the gas heat source. Additionally, significant cost is associated with heating the mineral layer, which serves no purpose. Accordingly, the gas used by the appliance increases over time as the mineral layer is formed. Note that (except for degradation over time) the gas-powered hot water tank is a regular or fixed-rate consumer of gas. In contrast, other appliances do not have substantially fixed or regular consumption of gas. In the example of a stove, different numbers of burners may be used and/or set to different heat levels.

In an example, the techniques described herein provide a means to identify increased consumption and provide information to customers and/or a utility company. Such information indicates an opportunity to repair or replace currently used appliances for more efficient appliances. In an example, an electronic notice may be sent to an in-home display, indicating the need to consider appliance-replacement. In a further example, a notice may be sent to the appliance-owning customer, perhaps including an appliance advertisement, coupon, rebate, and/or buy-back offer.

At block 902, flowrate data of gas delivered to a service point is obtained. The source of the flowrate data may be a metrology device of a gas meter (e.g., metrology device 126 of node 120 of FIG. 1). In an example, flowrate data may be obtained by a processor of a metering device (e.g., the data processing component 128 of node 120 of FIG. 1). In a further example, the flowrate data may be obtained by a processor of a server 106 at the central office from a node associated with a metering device. Alternatively, the flowrate data may be generated by any metering device and/or metrology device. It may be sent to, and/or be received or obtained by, any data processing device.

Block 904 shows a first example by which the flowrate may be obtained. In the example, the metrology device of a gas meter may be configured to measure cumulative consumption and not flowrate. As the gas is consumed, a mechanical device moves to measure a unit volume of gas and results in a switch closure to indicate that the full unit volume has been measured. Accordingly, each switch closure may be interpreted as consumption of the unit quantity of gas, which may be added to a running total that may be recorded and stored in memory. However, the time between successive switch closures may be used as, or used to determine, flowrate. In the event that a single appliance is using gas, the unit volume of gas and the period of time between switch closures (or number of closures within a period of time, etc.) may indicate flowrate of the particular appliance. Accordingly, a baseline flowrate of an appliance may be associated with a time between switch closures of a metrology device of the service point. This may be repeated for a plurality of appliances as needed.

Block 906 shows a second example by which the flowrate is obtained. In the example, the flowrate is measured at a smart gas meter. The flowrate may be obtained by the smart gas meter from a metrology device (e.g., a solid-state device) of the smart gas meter.

At block 908, having been obtained or received by a processor, the flowrate data may be disaggregated. The disaggregation process may result in determination of a baseline flowrate of an appliance having a fixed gas-consumption rate at the service point. In an example, the disaggregation may be performed by operation of all or part of the system of FIG. 1, devices of FIGS. 2 and/or 3, the techniques illustrated by FIGS. 4-6 and/or the methods of FIGS. 7 and 8. The disaggregation techniques receive flowrate data and output or identify one or more baseline gas flowrates associated with one or more individual appliances, such as a hot water tank or furnace, having fixed-rates of gas consumption (i.e., "regular" rates of gas consumption). Thus, identified baseline consumption levels may be associated with regular consumers of gas, i.e., appliances that have a fixed gas consumption rate, such as a hot water tank. Baseline consumption levels are not identified for variable consumers of gas, such as stoves, emergency generators, BBQs, and/or many gas fireplaces. In an example, a disaggregation function may be adjusted based at least in part on historical data indicating a change in gas consumption of the appliance over time. Thus, as gas use by the appliance changes, such as due to degradation of the appliance, the new gas use rate may be used to recognize the appliance in the disaggregation process.

In the example of block 910, the disaggregation function and/or process may be based at least in part on historical data indicating a change in gas rate consumption of the appliance over time. That is, by recognizing incremental and/or small changes in the historical use of gas by an appliance, the disaggregation process may recognize the appliance despite its (perhaps incremental) changing gas consumption. Such recognition may speed the disaggregation process, and may reduce the consumption of battery power in some systems.

At block 912, the baseline flowrate may be normalized for environmental factors to obtain a normalized baseline flowrate. In an example, the consumption of a hot water tank may be normalized to account for seasonal differences in incoming water temperature. The water temp could be a relative difference (e.g., current temperature vs. historical temperature(s)) based on season, or the water temperature could be a measurement of the actual water temperature (e.g. measured by Intelis Water meter or similar) relative to air temperature. In an example, the normalization lessens the risk of identifying an efficient hot water tank as inefficient, when in fact the hot water tank is heating cooler incoming water in the winter. In a second example, the normalization lessens the risk of identifying an inefficient hot water tank as efficient, when in fact it is heating warmer incoming water in the summer. In a further example, baseline flowrate may be normalized based at least in part using outside temperatures at the time the baseline flowrate was disaggregated from the flowrate of gas.

In an example of a gas meter using a mechanical metrology device, either the flowrate (if it has been calculated) or the time between switch closures (if this value is being used as the benchmark of appliance condition) may be adjusted to normalize the gas usage. The adjustment may be made based on environmental conditions (e.g., temperature) and may then allow comparison to historical usage flowrates that may also be recorded using time between switch closures and/or using flowrates derived from time between such closures. In an example, normalizing the baseline flowrate may include calculating differences in gas required to adjust for different incoming water temperatures and/or calculating differences in gas required to adjust for different ambient air temperatures.

In a still further example, normalizing the baseline flowrate of the appliance may be based at least in part on contemporary and/or historical use of other appliances at other respective service points. Accordingly, if appliances at other service sites are using more or less gas and/or are deviating from their historical values, the baseline flowrate may be normalized based at least in part on those events. In an example, a value indicating normalized gas use at a customer's site may be increased in the normalization process if customers' appliances at other site(s) are using more gas, or the reverse.

In some example, the normalizing of block 912 may be omitted. Accordingly, in block 912 the comparison may be of actual flowrates and environmental conditions may be considered—or not—in other manners. For example, flowrates associated with similar environmental conditions may be compared at block 914, thereby considering environmental conditions without the need to normalize. In an example, gas use by a hot water tank may be compared to gas use by the tank when the incoming water is nearly the same temperature. Alternatively, an adjustment may be made in the comparison if the temperature is different.

At block 914, the normalized baseline flowrate may be compared to historical levels of gas usage of an appliance. The historical levels of gas usage may be stored in absolute terms and/or in normalized (according to environmental conditions at the time of gas consumption) terms. In an example, the historical levels of gas usage may be stored on a cloud-based environment, the central office having a remote server 106, on the memory device 216 of a metering device and/or encoder transceiver module 206, etc. In an example of a gas meter using mechanical metrology device, the flowrate may be compared to historical flowrates by comparing a normalized time between switch closures to normalized historical time between switch closures. However, if flowrate has been calculated based on the time between switch closures, the flowrate may be compared to historical flowrates. In an example of comparing the normalized baseline flowrate to historical normalized baseline flowrates, the current values for the elements 1102, 1202, and/or 1302 (discussed with respect to FIGS. 11-13 below) may be compared to historical levels of these element(s). In a further example, the historical levels of gas usage may include maintaining disaggregated data of individual appliances over time.

When comparing the normalized baseline flowrate of an appliance at a service site to historical usage, in some instances it is helpful to compare the normalized flowrate to historical use of appliances at other service sites. Thus, the process of comparing may include comparing the normalized baseline flowrate to the historical levels of gas at the service point and to historical levels of gas use by appliances at other service point(s).

Accordingly, the normalization process at block 912 and the comparison process at block 914 may in some examples consider data from other service sites. Such data use may prevent flagging of an appliance as degraded, when in fact conditions at other service sites may suggest other factors caused the appliance to use more gas.

At block 916, based at least in part on the comparison of block 914, it is determined if gas consumption by the appliance has increased over time and if that increase indicates appliance degradation. In an example, if the gas increase (if any) is greater than a threshold value, then appliance degradation is indicated. Example actions of block 916 are shown and/or described by examples illustrated in FIGS. 10 through 13, wherein gas use by an appliance increases over time.

Figure 10:
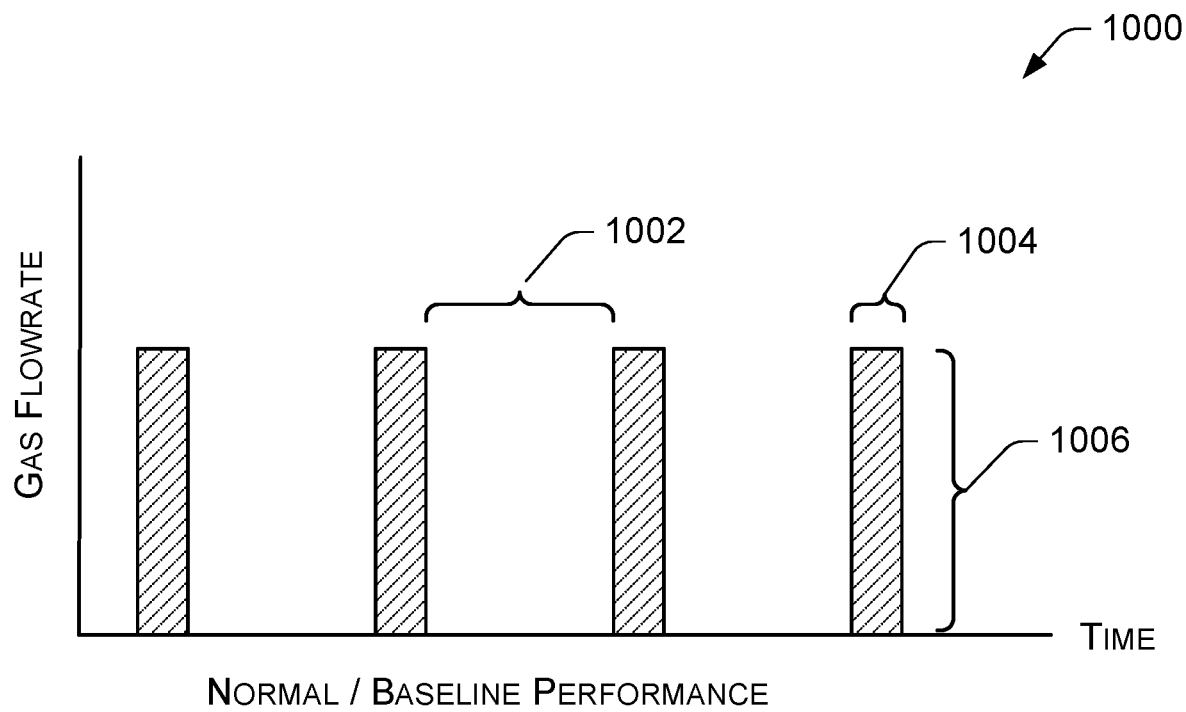
FIG. 10 is a graph showing normal operation of an appliance having a duty cycle including alternating periods of activity and sleep, and a gas usage rate.

In a first example 1000 of block 916 seen in FIG. 10, an expected duty cycle and/or time 1002 between appliance operation is shown. The time 1004 of appliance operation (i.e., duration of operation) and flowrate 1006 during appliance operation are shown. Accordingly, if the normalized baseline flowrate (from block 910) is consistent with (e.g., within a threshold value of): the time of operation 1004; the times between operations 1002; and the gas flowrate during operation 1006, then the appliance may be considered to be in good health and/or at an appliance health level at a time at which the method 900 became operational.

Figure 11:
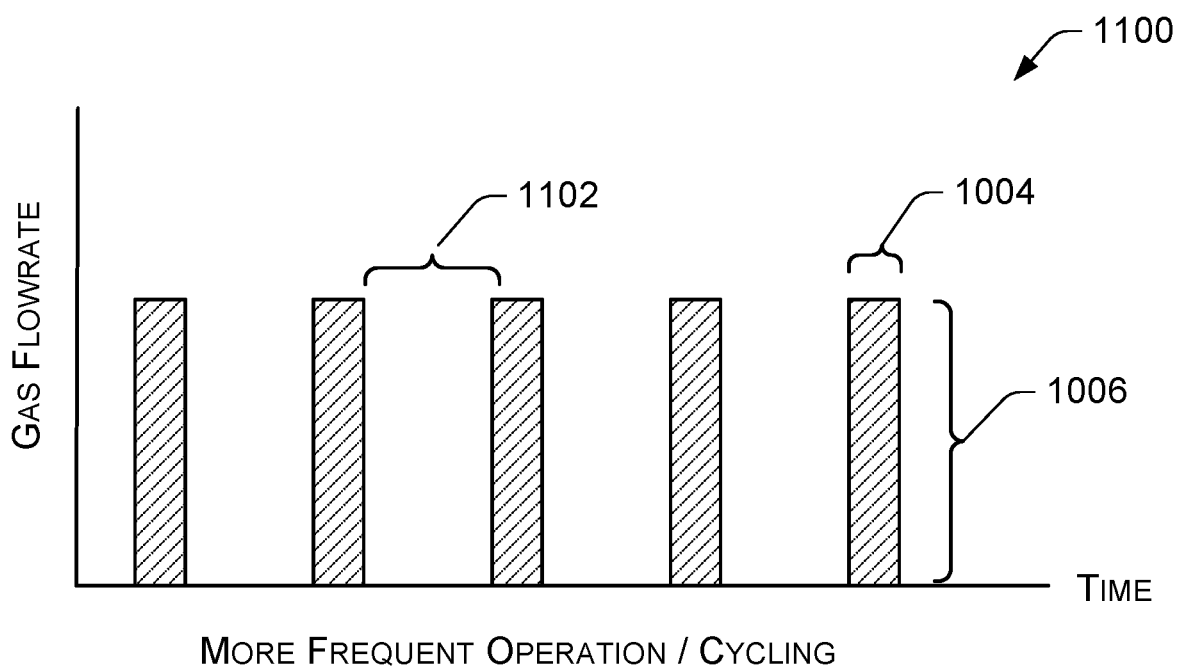
FIG. 11 is a graph showing operation of an appliance having shortened periods of sleep and/or inactivity.

In a second example 1100 of block 916 seen in FIG. 11, the time between operations 1102 is shortened (e.g., by more than a threshold value) when compared to one or more historical values (e.g., time between operations 1002). Shortening by more than a threshold value when compared to historical value(s) may indicate increased gas consumption by the appliance. While not required, the duration of appliance operation 1004 and the gas used 1006 during operation remains as seen in FIG. 10. Accordingly, if the normalized baseline flowrate (from block 910) has a time between operations 1102 that is shortened by more than a threshold value, the condition of the appliance may be considered to have degraded since the appliance was new and/or since the method 900 became operational.

Figure 12:
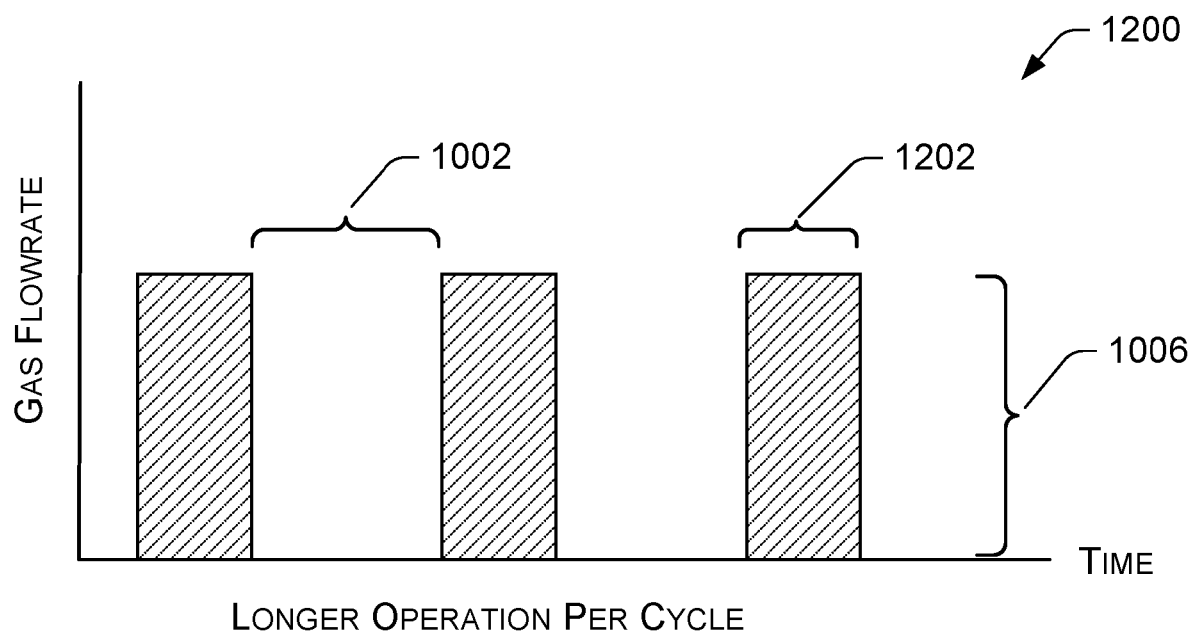
FIG. 12 is a graph showing operation of an appliance having lengthened periods of activity and/or operation.

In a third example 1200 of block 916 seen in FIG. 12, the time of operation 1202 of the appliance has lengthened (e.g., by more than a threshold value) when compared to one or more historical values (e.g., time of operation 1004). When time of operation 1202 exceeds historical value(s) of the time of operation 1004 gas consumption by the appliance may have increased. While not required, the time 1002 between operations of the appliance and the gas used 1006 during operation remains as seen in FIG. 10. Accordingly, if the normalized baseline flowrate (from block 910) has a time of operation 1202 that has lengthened by more than a threshold value, the condition of the appliance may be considered to have degraded since the appliance was new and/or since the method 900 became operational.

Figure 13:
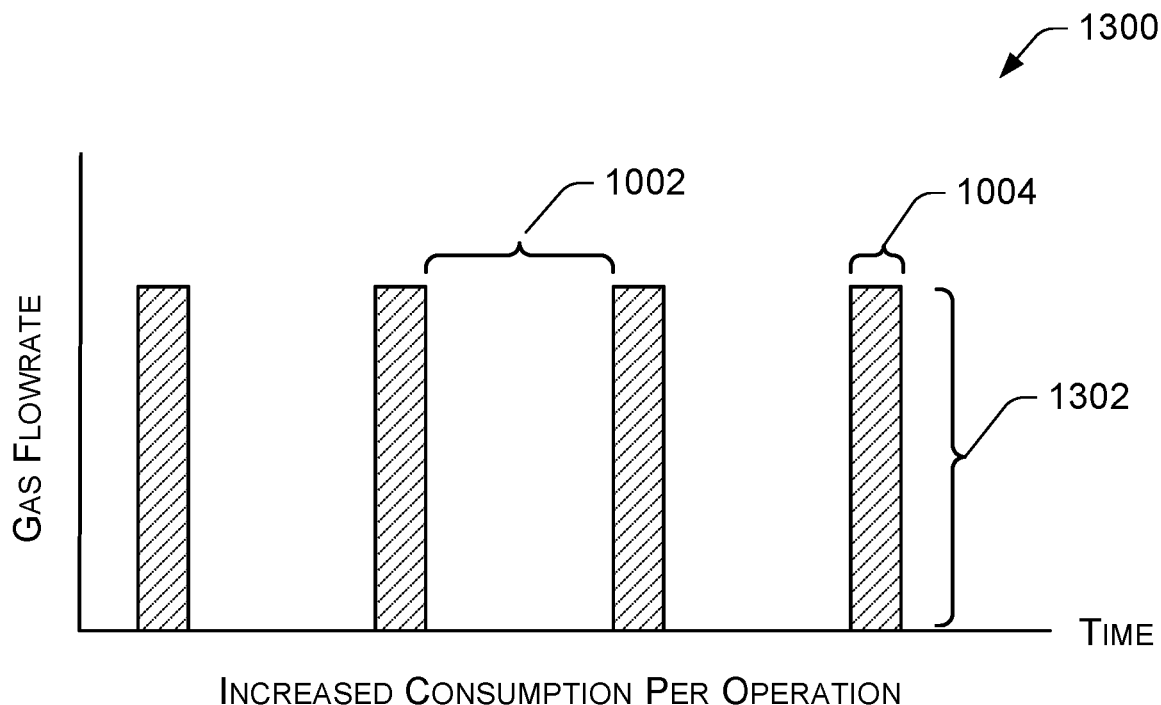
FIG. 13 is a graph showing operation of an appliance wherein periods of activity use excessive amounts of gas.

In a fourth example 1300 of block 916 seen in FIG. 13, the flowrate 1302 of gas used in the operation of the appliance has increased (e.g., by more than a threshold value) when compared to one or more historical values (e.g., flowrate 1006). This may include a steady rate of gas used in the operation of the appliance. Alternatively, it may be determined if a peak instantaneous gas flowrate measured during periods of continuous gas use by the appliance is increasing with respect to historical values. When flowrate 1302 (either steady-state or instantaneous peak) exceeds historical value(s) of the flowrate 1006, gas consumption by the appliance may have increased. While not required, the time 1002 between operations of the appliance and time 1004 during operation remains as seen in FIG. 10. Accordingly, if the normalized baseline flowrate (from block 910) has an increased gas flowrate 1302 during operation of the appliance, the appliance may be considered to have degraded somewhat since the appliance was new and/or since the method 900 became operational.

Accordingly, example operations of block 916 are understood with reference to FIGS. 10-13. FIG. 10 shows preferred operation of a healthy appliance (or the health of the appliance at the onset of method 900). FIGS. 11-13 show example conditions that may be checked at block 916 when making comparisons to historical flowrates. Note that while the example conditions are each shown in isolation in FIGS. 11-13, in some instances of operation of method 900 more than one of the examples of appliance degradation shown in FIGS. 11-13 could be simultaneously present. Thus, one or more of: aspects of shortened time between operation 1102; longer periods of operation 1202; and/or higher gas flowrate during operation 1302 may be present simultaneously in an appliance as it degrades over its lifecycle.

At block 918, based at least in part on the comparing blocks 912 and/or 914, it is determined if the normalized baseline flowrate of gas (e.g., as determined at block 910) used by the appliance has increased over time. In an example, aspects of shortened time between operation 1102, longer periods of operation 1202, and/or higher gas flowrate during operation 1302 may be considered, as discussed with respect to FIGS. 10-13. Any one or more of the characteristic changes 1102, 1202 and/or 1302 may be used to indicate increased gas consumption by an appliance over time.

Block 920 shows examples by which it may be determined if a change in flowrate indicates appliance degradation. In one example, threshold(s) may be used to compare to one or more of: a change in gas flowrate resulting from decreased time between appliance operations; increased time of appliance operations; increased gas flowrate during operations; and/or combinations of these. In a further example, increased gas use by the appliance may be determined by use of statistical techniques such as standard deviation.

At block 922, an action is performed in response to determining that an appliance has increased its gas consumption and is operating inefficiently. In a first example, a customer owning the appliance is notified (e.g., by mail, email, message sent to an in-home display or display linked to a smart gas meter, etc.) that the appliance has degraded, and that repair or replacement is recommended. In a second example, the appliance is repaired. In a third example, the appliance is replaced. In a fourth example, an alarm notification may be provided to a device, such as an in-home display of the customer or a server of a utility company or third-party service company.

Further Example of Recognition of Appliance Degradation at Service Point

FIG. 9A shows an example method 900A of determining gas appliance performance and/or performance degradation over time. As appliances age, they may begin to consume more gas. By obtaining a gas flowrate of a residence or business a disaggregation process may be utilized to determine fixed-rate gas-consuming appliances. By comparing the fixed-rate of such an appliance to historical records, it may be determined if the appliance is consuming more gas. Example ways that an appliance may consume more gas are shown in FIGS. 10-13. If more gas is being consumed, notifications may be sent and/or repair or replacement may be performed.

At block 930, a flowrate of gas is obtained by a device at a service site. At block 932, several examples are shown by which data may be obtained. In an example, the data may include and/or be based on time between switch closures in a mechanical gas meter. In a second example, the data may include and/or be based on a number of switch closures over a period of time. In a third example, the data may be obtained by or from a metrology device that can directly measure the flowrate of gas.

At block 934, the flowrate of gas may be disaggregated to obtain a representation of a flowrate of gas corresponding to one or more appliances having a generally fixed-rate of gas-consumption. An example of such an appliance may be a hot water tank. Some furnaces have multiple burners, and may be recognized in the disaggregation process as two or more fixed-rate of gas-consumption appliances.

In an example, the disaggregation function may be adjusted based at least in part on historical data indicating a change in gas consumption of the appliance over time. In the example, the disaggregation function may be configured to verify old disaggregation results in less time than is required to do a completely new disaggregation. However, as a gas flowrate of a fixed-rate appliance grows due to appliance degradation, known disaggregation functions may not recognize the current appliance (that currently uses somewhat more gas) as the previously identified appliance (that previously used somewhat less gas). However, a more advanced disaggregation function may recognize the possibility that a slightly larger flowrate may indicate operation of the same appliance which previously had a slightly smaller flowrate, and may thereby accelerate operation of the disaggregation function.

At block 936, the representation of the flowrate of gas corresponding to the appliance is compared to a representation of historical gas consumption by the appliance. In the example of block 938, the representation of historical gas consumption by the appliance (for use in the comparison) may be selected based at least in part on environmental conditions. In the example of block 940, compensation may be made for differences in environmental conditions at times the two flowrates were measured.

At block 942, based at least in part on the comparing, it may be determined that performance of the appliance has changed over time. In the example of block 944, the determination of block 942 may be based at least in part on one or more of the techniques or characteristics shown in FIGS. 11-13.

At block 946, based at least in part on the determination, a notification may be generated. The notification may include information about the appliance and its increased gas usage.

At block 948, the notification may be transmitted to another device. In the example of block 950, the device may be an in-home display, cell phone application, email message to a resident of the service site, the gas-supplying utility company, or other device and/or entity. Alternatively, or additionally, the appliance may be repaired or replaced, depending on circumstances.

Further Example of Recognition of Appliance Degradation at Service Point

The following numbered clauses include additional examples of determining gas appliance performance and/or performance degradation over time.

1. A method, comprising: obtaining a flowrate of gas by a device at a service site; disaggregating the flowrate of gas to obtain a representation of a flowrate of gas corresponding to an appliance having a generally fixed-rate of gas consumption; comparing the representation of the flowrate of gas corresponding to the appliance to a representation of historical gas consumption by the appliance; determining, based at least in part on the comparing, that performance of the appliance has changed over time; generating a notification, based at least in part on the determination; and transmitting the notification to another device.

2. The method of clause 1, wherein the disaggregating, comparing and determining are performed at: a server at a central office; or a data processing component of the device at the service site.

3. The method of clause 1, wherein obtaining the flowrate of gas at the service site comprises: obtaining data regarding time between switch closures; obtaining data regarding a number of switch closures over time; or obtaining data from a metrology device that can directly measure the flowrate of gas.

4. The method of clause 1, wherein the representation of historical gas consumption by the appliance comprises: a record of gas consumption and a record of corresponding environmental conditions.

5. The method of clause 1, additionally comprising: selecting the representation of historical gas consumption by the appliance based at least in part on environmental conditions.

6. The method of clause 1, wherein comparing the representation of the flowrate of gas corresponding to the appliance to the representation of historical gas consumption by the appliance comprises: compensating for differences in environmental conditions at times the two flowrates were measured.

7. The method of clause 1, wherein determining that performance of the appliance has changed over time comprises: determining that a duration of a period of usage has changed compared to the representation of historical gas consumption by the appliance.

8. The method of clause 1, wherein determining that performance of the appliance has changed over time comprises: determining that a time between periods of usage has changed compared to the representation of historical gas consumption by the appliance.

9. The method of clause 1, wherein determining that performance of the appliance has changed over time comprises: determining that an amplitude of usage has changed compared to the representation of historical gas consumption by the appliance.

10. The method of clause 1, wherein determining that performance of the appliance has changed over time comprises: determining that a peak amplitude of usage has changed compared to the representation of historical gas consumption by the appliance.

11. The method of clause 1, wherein the transmitting the notification to another device comprises transmitting the notification to an in-home device.

12. A headend device, comprising: a processor; a network connection; and one or more computer-readable media storing computer-executable instructions that, when executed by the processor, configure the headend device to perform operations comprising: obtaining a flowrate of gas; disaggregating the flowrate of gas to obtain a representation of a flowrate of gas corresponding to an appliance having a generally fixed-rate of gas consumption; comparing the representation of the flowrate of gas corresponding to the appliance to a representation of historical gas consumption by the appliance; determining, based at least in part on the comparing, that performance of the appliance has changed over time; and sending a message indicating repair or replacement of the appliance, consistent with the determining, is indicated.

13. The headend device as recited in clause 12, wherein disaggregating the flowrate of gas comprises: adjusting a disaggregation function based at least in part on historical data indicating a change in gas consumption of the appliance over time.

14. The headend device as recited in clause 12, wherein the appliance is located at a first service point, and wherein the comparing additionally comprises: comparing the representation of the flowrate of gas corresponding to the appliance to a representation of gas consumption by an appliance at a second service point.

15. The headend device as recited in clause 12, wherein the representation of historical gas consumption by the appliance comprises at least one of: a representation of ambient air temperature; a representation of incoming gas temperature; and a representation of incoming water temperature.

16. One or more computer-readable media storing computer-executable instructions that, when executed by one or more processors, configure a computing device to perform acts comprising: obtaining a flowrate of gas; disaggregating the flowrate of gas to obtain a representation of a flowrate of gas corresponding to an appliance having a generally fixed-rate of gas consumption; comparing the representation of the flowrate of gas corresponding to the appliance to a representation of historical gas consumption by the appliance; determining, based at least in part on the comparing, that performance of the appliance has changed over time; generating a notification, based at least in part on the determination; and transmitting the notification to another device.

17. One or more computer-readable media as recited in clause 16, wherein determining that performance of the appliance has changed over time comprises: determining that a duration of a period of usage has changed compared to the representation of historical gas consumption by the appliance.

18. One or more computer-readable media as recited in clause 16, wherein determining that performance of the appliance has changed over time comprises: determining that a time between periods of usage has changed compared to the representation of historical gas consumption by the appliance.

19. One or more computer-readable media as recited in clause 16, wherein determining that performance of the appliance has changed over time comprises: determining that an amplitude of usage has changed compared to the representation of historical gas consumption by the appliance.

20. One or more computer-readable media as recited in clause 16, wherein the representation of historical gas consumption by the appliance comprises at least one of: a representation of ambient air temperature; a representation of incoming gas temperature; and a representation of incoming water temperature.

Example Recognition of Under-Sized Gas Capacity at Service Point

Figure 14:
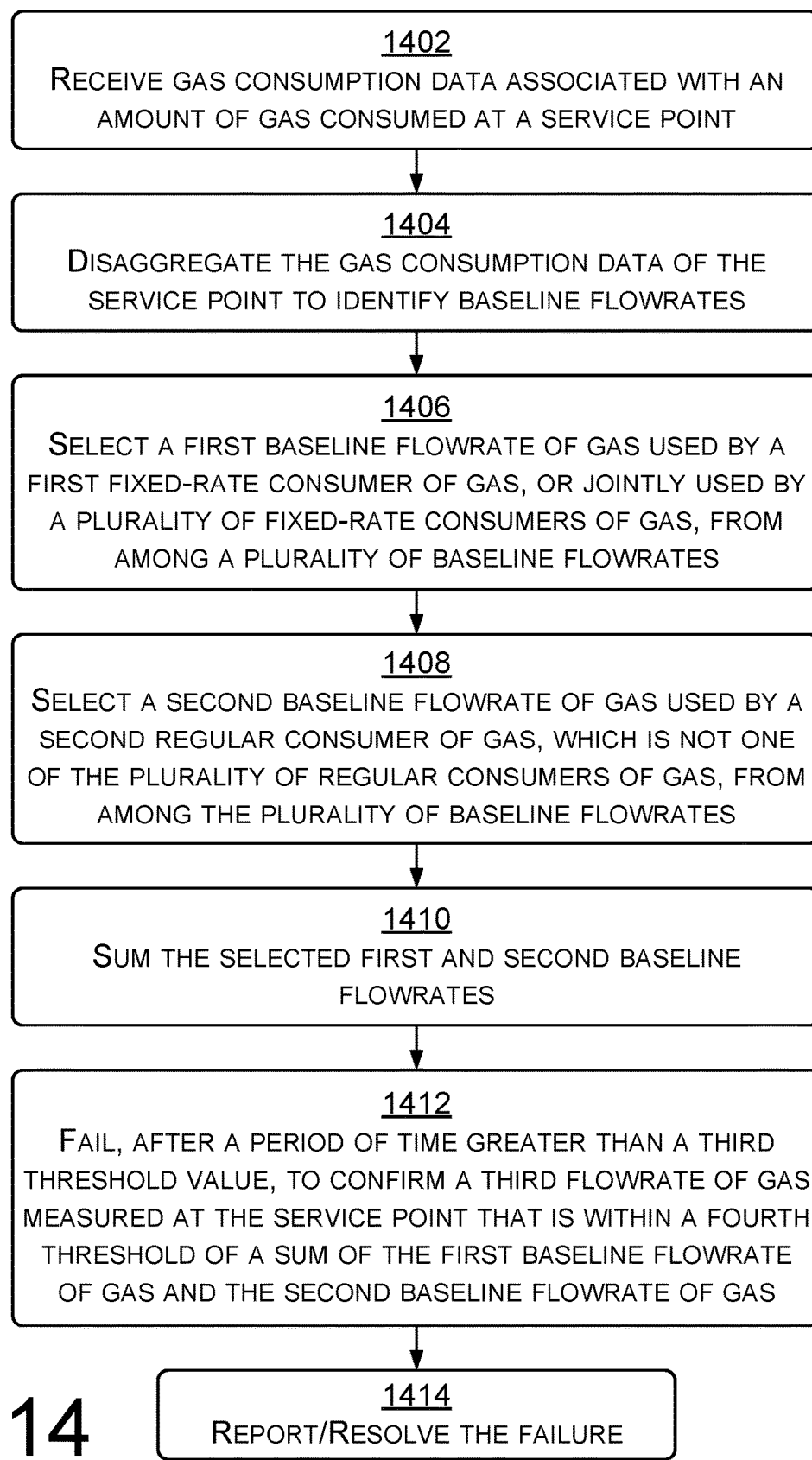
FIG. 14 is a flow diagram showing an example method of determining meter or service under-sizing.
Figure 15:
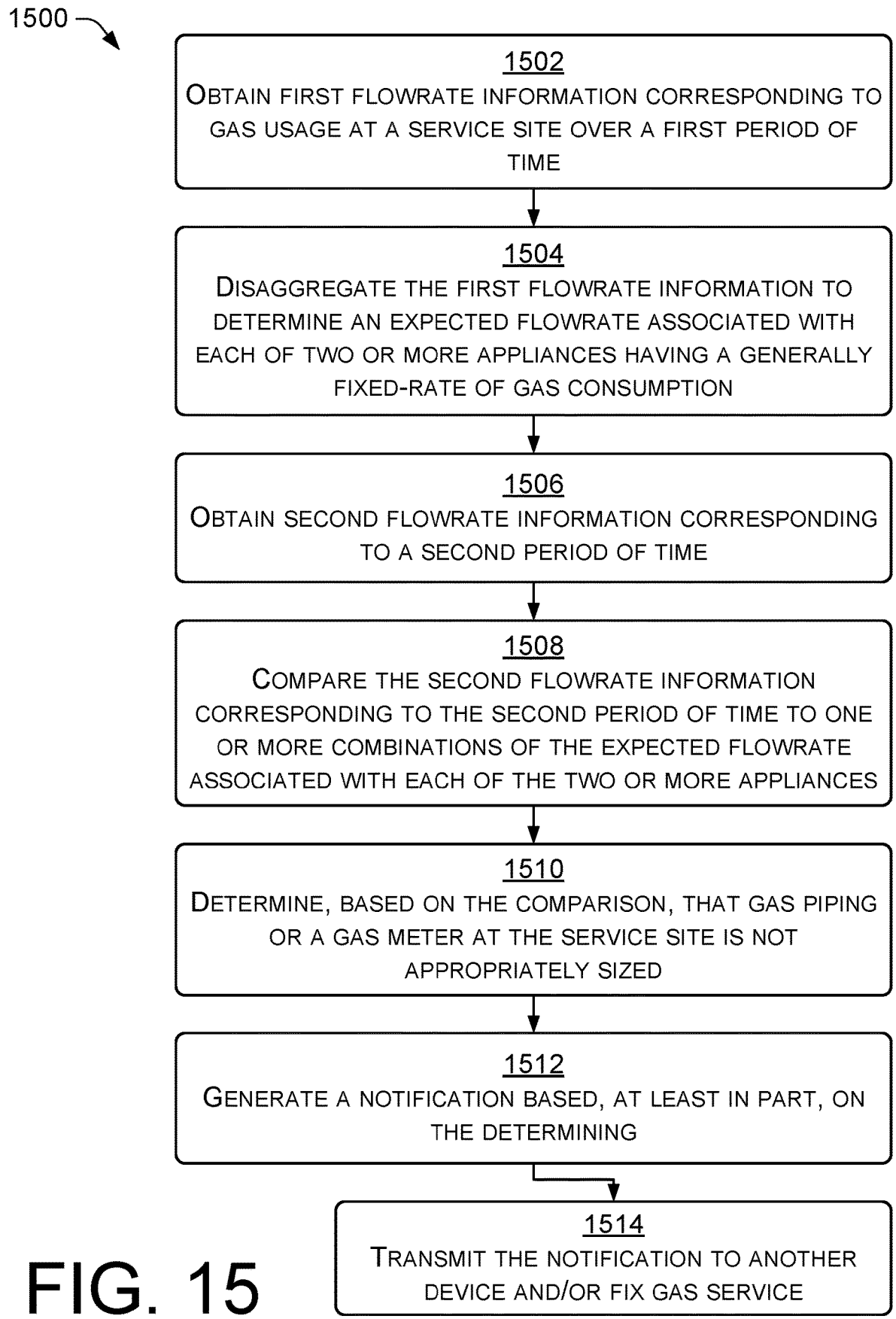
FIG. 15 is a flow diagram showing a second example method of determining meter or service under-sizing.

FIGS. 14 and 15 shows an example methods 1400 and 1500 to determine if a gas service is adequately sized. Gas service sizing may be based at least in part on gas pipe diameter, gas pressure, etc. While an order of the blocks of the method is shown, some variation in the order of execution may be made without departing from the scope of the method as disclosed or claimed. The methods may be performed by any device, such as those having a processor and memory. In several examples, the methods may be performed by a smart gas meter, which may be associated with node 108 of FIG. 1. The method may be performed by computer devices such as a server 106 within the central office, a cloud-based computing service, or other computing device, etc. The methods may be performed at a headend device, a service point or performed by a combination of devices. In an example, the method 1400 may be performed by execution of software or an application running on a smart meter, central office server, and/or other device. In the examples of FIG. 1, the techniques 130 may include, and/or be configured as, an application able to execute the methods. In the examples of FIGS. 2 and 3, the methods may be performed by software stored in memory device 216 and executed by a processing device and/or processor 214.

Customers may upgrade appliances and/or add appliances that consume natural gas. As a result, the gas required by a service site can increase over time. The techniques discussed herein identify service sites having an inadequate or undersized gas flow capacity. The techniques provide notification to upgrade the gas service before gas-supply under-sizing degrades the customer's experience.

In an example, a system is configured to perform the techniques discussed herein. The system may receive gas consumption data associated with an amount of gas consumed at a service point. The data may be disaggregated to determine at least two single-appliance baseline (or reference) rates of gas consumption. The baseline rates are flowrates of appliances that have a generally fixed consumption rate. The system then determines if the at least two appliances can be operated simultaneously. The at least two single-appliance baseline rates of gas consumption may be added together, to thereby produce a sum indicating a combined gas flowrate of the fixed consumption rate devices connected to the gas service. After a period of time greater than a first threshold value (e.g., 6 months or a year), if the system fails to detect a flowrate of gas measured at the service point that is within a second threshold value of the sum it is likely that the two or more fixed-rate appliances operated simultaneously while using less gas than the sum of their baseline rates. The first threshold may be several months in duration, during which the system tries to recognize all of the fixed consumption rate appliances operating simultaneously. The second threshold regulates how close the measured flowrate must be to the sum of the appliances' baseline flowrates. That is, for the threshold period of time, the system looks for a gas flowrate that is within another threshold value of the sum of the appliances' baseline flowrates. In the event of a failure, the system then reports the failure to a main office or other system. In an environment of an under-sized service, several fixed-rate consumers of gas (e.g., a hot water tank) may be operating at less than the sum of their actual fixed rates, due to the undersized nature of the service. Obviously, this is detrimental to the consumer and the appliance, and is identified by the techniques of the methods 1400 and 1500.

In FIG. 14 at block 1402, gas consumption data, which is associated with an amount of gas consumed at a service point, is received. In an example, the received gas consumption data includes, or is based at least in part on, data including elapsed time between switch closures of a gas metrology unit at the service point. In another example, the received gas consumption data includes, or is based at least in part on, flowrate data obtained from a solid-state metrology device.

At block 1404, the gas consumption data is disaggregated to identify a plurality of (e.g., two or more) baseline flowrates. The baseline flowrates may include the flowrates of several fixed-rate (or "regular") consumers of gas, like many hot water tanks, hot tubs and furnaces. In an example, the disaggregation may be performed by operation of all or part of the system of FIG. 1, devices of FIGS. 2 and/or 3, and/or the methods of FIGS. 3-8. The disaggregation may be performed at a smart metering device of the service point, at a remote server (e.g., of a utility company), or any selected computing device. In an example, the disaggregation process may include identifying baseline flowrates of each of a plurality of regular consumers of gas comprising fixed-gas-use appliances and/or identifying baseline flowrates of summations of two or more of regular consumers of gas. Within the summations, the constituent appliances whose individual flowrates result in the summation may be identified.

In an example, the disaggregation of gas usage may be performed using new gas consumption data to determine if new baseline flowrate(s) are present. In an example, the disaggregating includes identifying baseline flowrates of a plurality of consumers of gas comprising fixed-gas-use appliances and identifying a composite flowrate including a summation of at least two fixed-gas-use appliances.

At block 1406, a first baseline flowrate of gas used by a first regular and/or fixed-rate consumer of gas is selected. In an example, a first baseline flowrate of gas used by a first appliance, or a flowrate that represents gas used by two or more appliances, is selected from among two or more baseline flowrates.

At block 1408, a second baseline flowrate of gas used by a second regular and/or fixed-rate consumer of gas—which is not one of the two or more appliances selected in block 1406—is selected from among the plurality of baseline flowrates. Baseline flowrates are the gas flowrates needed by respective fixed-rate consumers (e.g., appliances) of gas. In an example, the first and second baseline flowrates are the largest two baseline flowrates. If the gas service is undersized, it may not be able to provide gas flow for the two largest baseline flowrates simultaneously. Accordingly, selection of the largest baseline flowrates provides a stronger test of the gas service to supply sufficient gas flow than selection of smaller baseline flowrates. In another example, baseline flowrates of all fixed-rate of gas consumption appliances are selected. By selecting larger flowrates or flowrates of all fixed-use appliances, the sum of block 1410 will be larger. The larger sum is a better test, at block 1412, to determine if the gas service size is adequate.

At block 1410, the selected first and second flowrates of gas are added together. The resulting sum is the flowrate associated with the simultaneous use of the appliances associated with the flowrates selected at blocks 1406 and 1408. If, over a period of time, a flowrate equal or nearly equal to the sum is measured at the service point, then it may be reasonably assumed that the appliances associated with the flowrates selected at blocks 1406, 1408 are operating simultaneously. Additionally, it may be assumed that each appliance is receiving the amount of gas that it received when other appliances were not also using gas. This would suggest that the gas service is adequately sized. However, if a flowrate equal to the sum is not seen after monitoring for a period of time, that may indicate that the gas service is unable to provide gas at the needed flowrate, i.e., the calculated sum.

At block 1412, after a period of time greater than a first threshold value, the system or device performing method 1400 may fail to detect and/or confirm a third flowrate of gas measured at the service point that is within a second threshold value of the sum of the first baseline flowrate of gas and the second baseline flowrate of gas. In other words, after watching the gas flowrate at the service site for a reasonable period of time (e.g., possibly months, through summer and winter, and/or through an electrical power outage when a gas-powered generator might be used) the system fails to measure a gas flowrate that is nearly (e.g., to within the second threshold value) equal to the sum of the first flowrate and the second flowrate. That is, the system fails to confirm that the two appliances (or groups of appliances) can operate at the same time with each using the full value of their respective baseline flowrates. This indicates that the gas supply to the service point is inadequate.

In some instances, the baseline flowrate of more than two appliances may be summed together to determine if the gas supply to the service is inadequate. In an example, all fixed-flowrate appliances are identified, and the techniques of block 1412 are applied. In a further example, combinations of gas flows of fixed flowrate appliances are tested at block 1412. A combination of three fixed flowrate appliances may exceed the service capacity at a service site, but simultaneous operation of the three appliances may happen with less frequency. Accordingly, the first threshold may have to be lengthened, when flowrates associated with a greater number of appliances are used in the summation of block 1410.

At block 1414, the system reports and/or corrects the inadequate gas supply to the service point. In an example, the system operating the method 1400 may determine a maximum flowrate over an interval of time and compare the maximum flowrate to the sum of the first baseline flowrate of gas and the second baseline flowrate of gas. In the example, the reporting may include the maximum flowrate measured over an interval, the first baseline flowrate, and/or the second baseline flowrate (and other baseline rates, e.g., if used in the summation that exceeded the service size). If the maximum flowrate measured over an interval of time is less than the sum of two or more baseline flowrates, then the amount by which the maximum flowrate is less than the sum may indicate a minimum amount by which the supply rate should be expanded at the service point. The service site may be replaced to include larger gas pipes, a larger gas meter, and/or other equipment and/or infrastructure to provide more gas and/or greater a gas flowrate to the service site.

In some examples, before reporting and/or correcting the inadequate gas supply to the service point, the method 1400 may include the steps of performing a further disaggregation and confirming that the first baseline flowrate and the second baseline flowrate are still present. This would prevent reporting of a problem with a service size when none existed.

Example Recognition of Under-Sized Gas Capacity at Service Point

FIG. 15 shows an example method 1500 to determine if a gas service is adequately sized. At block 1502, first flowrate information corresponding to gas usage at a service site may be obtained over a first period of time.

At block 1504, the first flowrate information may be disaggregated to determine an expected flowrate associated with each of two or more appliances having a generally fixed-rate of gas consumption.

At block 1506, second flowrate information corresponding to may be obtained over a second period of time.

At block 1508, the second flowrate information corresponding to the second period of time may be compared to one or more combinations of the expected flowrate associated with each of the two or more appliances.

At block 1510, based on the comparison, it may be determined that gas piping or a gas meter at the service site is not appropriately sized. In an example, two fixed-rate of gas-consumption appliances may operate at the same time. If the gas service is adequately sized, then the gas flowrate would be the sum of the two fixed-rate appliances (at times when other appliances are not operating). However, if that condition is never seen (i.e., a gas flowrate equal to the sum of the two fixed-rate values is not detected) then it is possible that the service to the site is undersized. In some examples, blocks 1502-1510 and/or blocks 1506-1510 may be repeated one or more times to determine if the gas service is, or has become, undersized. By repeating the disaggregation block 1504, any newly added fixed-rate gas-consuming appliance will be identified.

At block 1512, a notification may be generated, and may be based, at least in part, on the determination that the service at the customer's site is undersized.

At block 1514, the notification may be transmitted to another device. In examples, the message or notification may be transmitted to the customer and/or the gas utility company. In another example, the gas utility company and/or their agent may fix the gas service size, such as by changing to larger pipes and/or changing to a larger gas meter, and/or by making other appropriate changes.

Example Recognition of Under-Sized Gas Capacity at Service Point

The following numbered clauses include additional examples to determine if a gas service is adequately sized.

1. A method, comprising: obtaining first flowrate information corresponding to gas usage at a service site over a first period of time; disaggregating the first flowrate information to determine an expected flowrate associated with each of two or more appliances having a generally fixed-rate of gas consumption; obtaining second flowrate information corresponding to a second period of time; comparing the second flowrate information corresponding to the second period of time to one or more combinations of the expected flowrate associated with each of the two or more appliances; determining, based on the comparison, that gas piping or a gas meter at the service site is not appropriately sized; generating a notification based, at least in part, on the determining; and transmitting the notification to another device.

2. The method of clause 1, wherein the one or more combinations comprise: a sum of two or more of the expected flowrates associated with respective appliances of the two or more appliances.

3. The method of clause 1, wherein at least one of the two or more appliances having generally fixed-rate gas consumption is a gas hot water tank.

4. The method of clause 1, wherein the comparing comprises calculating a difference between: the second flowrate information corresponding to the second period of time; and the one or more combinations of the expected flowrate associated with each of the two or more appliances.

5. The method of clause 1, wherein disaggregating the first flowrate information to determine the expected flowrate associated with each of the two or more appliances comprises: excluding flowrates associated with appliances that have variable gas flowrates.

6. The method of clause 1, wherein obtaining the first flowrate information and obtaining the second flowrate information comprises: obtaining the second flowrate information after a threshold period of time has elapsed following obtaining the first flowrate information.

7. The method of clause 1, wherein aspects of the method are performed at a computing device at the service site.

8. The method of clause 1, wherein aspects of the method are performed at a computing device that is remote from the service site.

9. The method of clause 1, wherein the notification comprises a recommendation to upgrade a service at the service site, and wherein the method additionally comprises: upgrading the service at the service site to provide a greater gas flowrate than an original service at the service site, wherein the upgrading comprises changing at least one of a pipe size of incoming gas or a meter size at the service site.

10. One or more computer-readable media storing computer-executable instructions that, when executed by one or more processors, configure a computing device to perform acts comprising: obtaining first flowrate information corresponding to gas usage at an endpoint corresponding to a service site over a first period of time; disaggregating the first flowrate information to determine an expected flowrate associated with each of two or more appliances having a generally fixed-rate of gas consumption; obtaining second flowrate information corresponding to a second period of time; comparing the second flowrate information corresponding to the second period of time to one or more combinations of the expected flowrate associated with each of the two or more appliances; determining, based on the comparison, that gas piping or a gas meter at the service site is not appropriately sized; generating a notification based, at least in part, on the determining; and transmitting the notification to another device.

11. One or more computer-readable media as recited in clause 10, wherein the disaggregating comprises: excluding flowrates associated with appliances that have variable gas flowrates.

12. One or more computer-readable media as recited in clause 10, wherein the disaggregating comprises: identifying all single-appliance baseline flowrates of fixed-rate gas appliances operating at the service site.

13. One or more computer-readable media as recited in clause 10, wherein the second flowrate information does not match flowrates of any combinations of the two or more appliances.

14. One or more computer-readable media as recited in clause 10, wherein the comparing identifies a combination of appliances having a combined flowrate of gas that is greater than all flowrates included in the second flowrate information.

15. One or more computer-readable media as recited in clause 10, wherein the comparing comprises calculating a difference between: the second flowrate information corresponding to the second period of time; and the one or more combinations of the expected flowrate associated with each of the two or more appliances.

16. A system, comprising: a metering device to meter gas usage at a service point and to send data; and a headend to receive the data, wherein the data comprises: consumption data; and timing data indicating duration of a plurality of time intervals between switch closures of the metering device, wherein each switch closure indicates measurement of a unit volume of gas; wherein the headend comprises a processor and memory configured with instructions, which when executed perform acts comprising: obtaining first flowrate information corresponding to gas usage at an endpoint corresponding to a service site over a first period of time; disaggregating the first flowrate information to determine an expected flowrate associated with each of two or more appliances having a generally fixed-rate of gas consumption; obtaining second flowrate information corresponding to a second period of time; comparing the second flowrate information corresponding to the second period of time to one or more combinations of the expected flowrate associated with each of the two or more appliances; determining, based on the comparison, that gas piping or a gas meter at the service site is not appropriately sized; generating a notification based, at least in part, on the determining; and transmitting the notification to another device.

17. The system of clause 16, wherein disaggregating gas usage at the service point comprises: identifying flowrates of all appliances having fixed-flowrates of gas operating at the service point.

18. The system of clause 16, wherein the comparing comprises: comparing the second flowrate information to a sum of flowrates associated with all fixed-rate appliances identified by the disaggregation.

19. The system of clause 16, wherein the comparing comprises: determining that the second flowrate information does not match flowrates associated with any combination of fixed-rate appliances identified by the disaggregation.

20. The system of clause 16, wherein the determining that gas piping or the gas meter at the endpoint are not appropriately sized comprises: determining that one or more of the gas piping or the gas meter at the service site is too small for the service point.

Example Recognition of Low Gas Pressure Supply at Service Point

Figure 16:
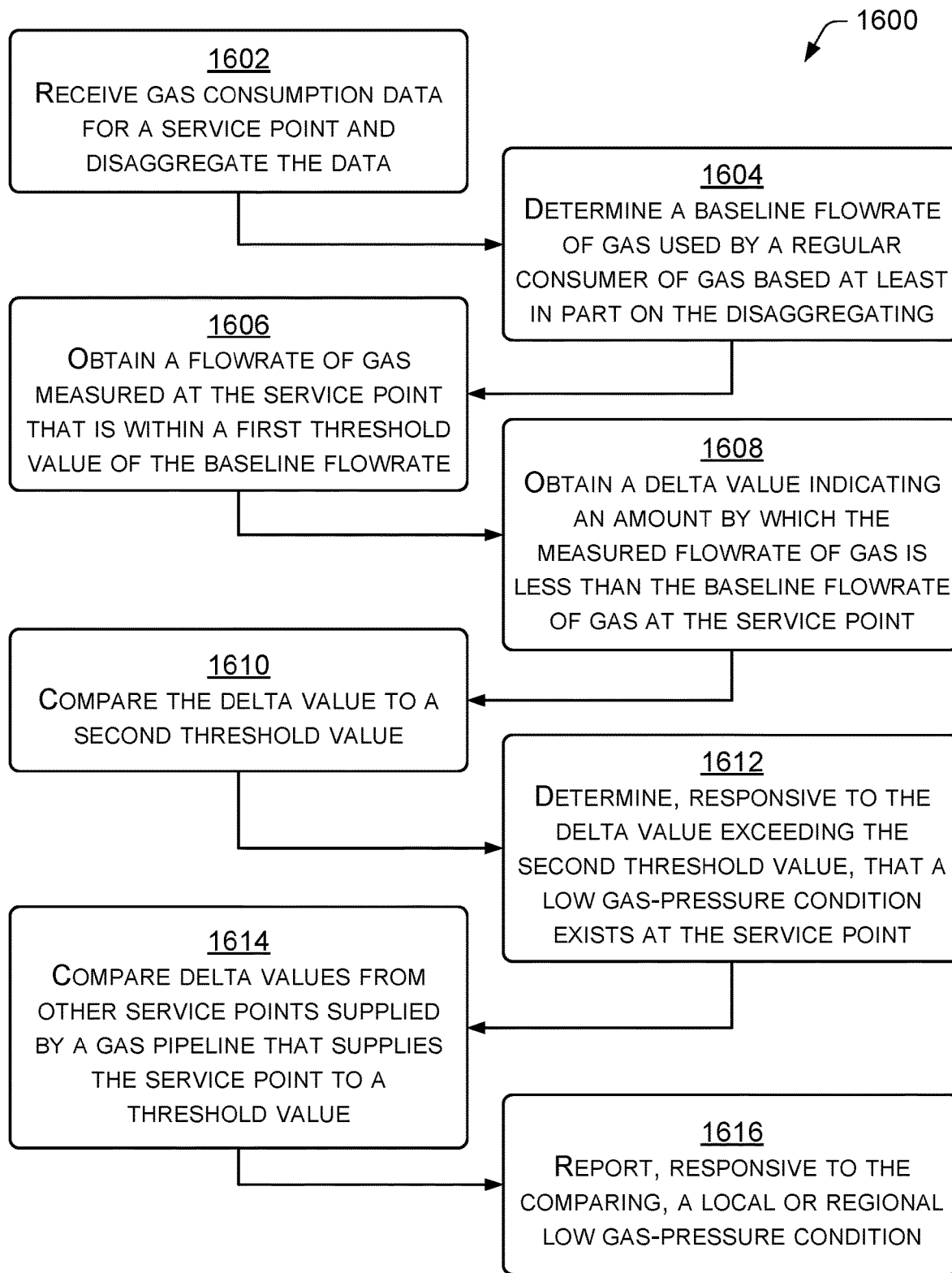
FIG. 16 is a flow diagram showing an example method of detecting areas of low gas pressure without pressure sensors.
Figure 17:
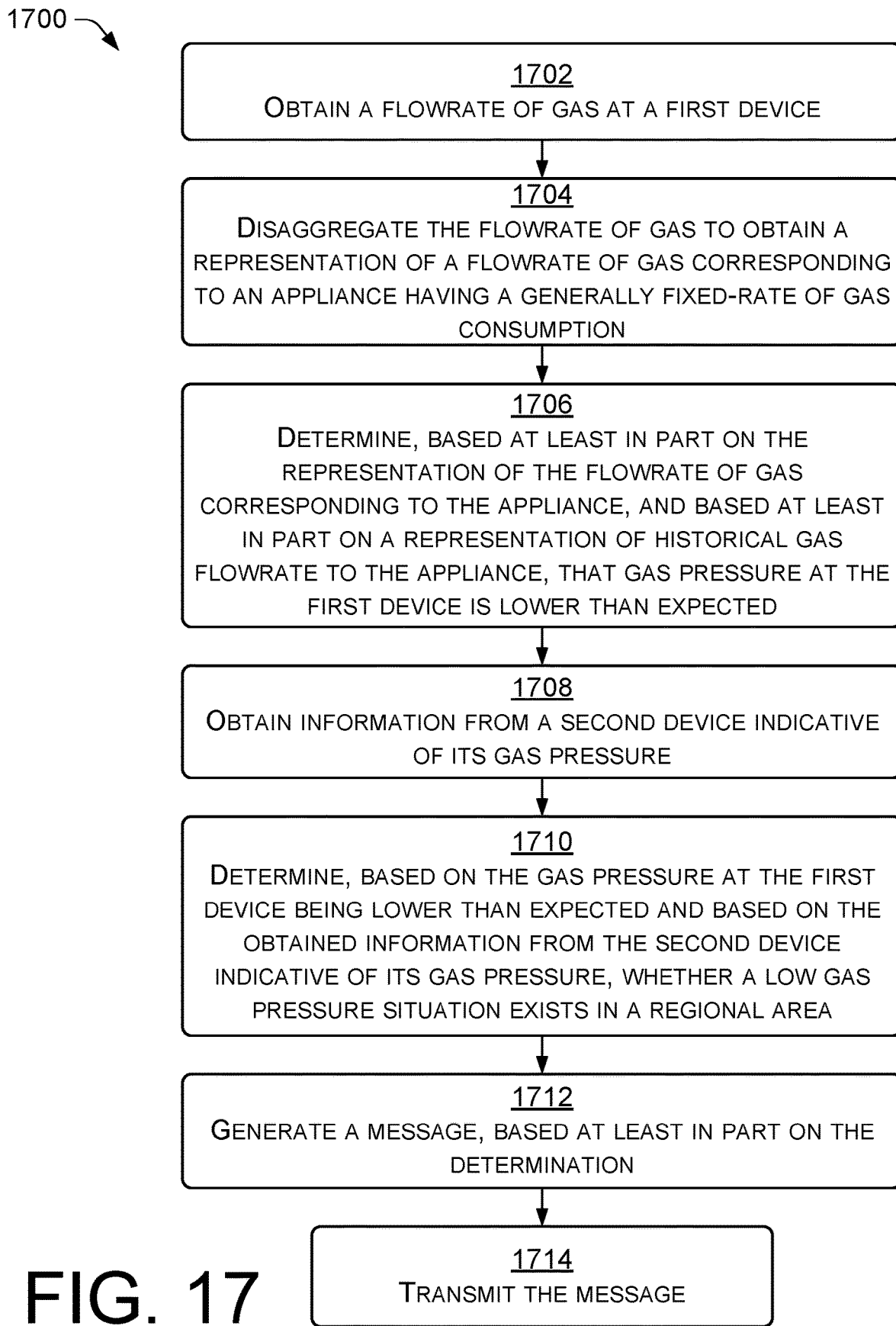
FIG. 17 is a flow diagram showing a second example method of detecting areas of low gas pressure without pressure sensors.
Figure 18:
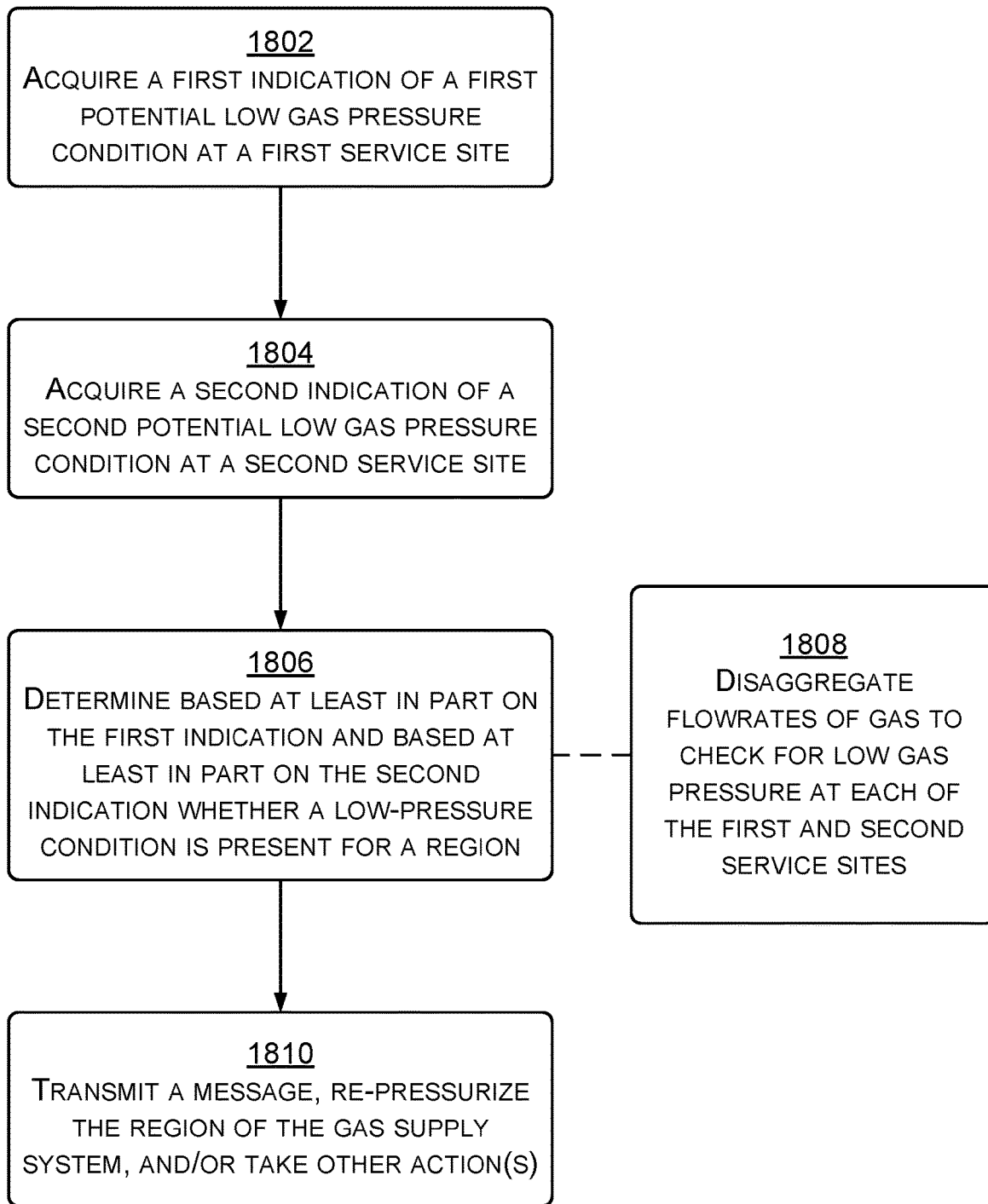
FIG. 18 is a flow diagram showing a third example method of detecting areas of low gas pressure without pressure sensors.

FIGS. 16-18 show example methods 1600, 1700, 1800 to determine if one or more service sites are experiencing a low gas-pressure condition, i.e., lower than desired or designed gas pressure is presented to the meter of a service site by the piping of the system. Such a condition may result from a leak in the area or from higher than normal consumption of gas by the service site(s) in an area.

While an order of the blocks of the method is shown, some variation in the order of execution may be made without departing from the scope of the method as disclosed or claimed. The methods may be performed by any device, such as those having a processor and memory. In several examples, the methods may be performed by a smart gas meter, e.g., a smart meter associated with node 108 of FIG. 1. The method may be performed by computer devices within the central office 106, a cloud-based computing service, or other computing device, etc. The methods may be performed by a headend device, a service point (e.g., smart gas meter) or performed by a combination of devices. In an example, the methods may be performed by execution of software or an application running on a smart meter, central office server, or other device. In the examples of FIG. 1, the techniques 130 may include and/or be configured as an application able to execute the methods. In the examples of FIGS. 2 and 3, the methods may be performed by software stored in memory device 216 and executed by a processing device and/or processor 214.

Utility companies attempt to maintain a stable and prescribed level (or range) of gas pressure at the meter of each service point. This level provides customers with optimal service. However, gas usage may increase at certain times, such as during particularly cold weather. Similarly, a gas leak may lower gas pressure in an area of several metering devices. The techniques discussed herein identify service sites or regions of service sites where the prescribed level of gas pressure has fallen, thereby creating a low gas-pressure condition. The techniques described herein allow detection of such condition without the use of gas pressure sensors, which are typically unavailable in many or most locations of a gas supply system. That is, in many gas-supply systems, metrology devices are configured to measure a quantity of gas flow and cumulative gas consumption, but do not measure gas flowrate or gas pressure. This is particularly true of mechanical metrology devices that are widespread in many regions of the country and world.

In an example, a system is configured to perform the techniques discussed herein. The system may disaggregate gas usage at a service point to determine a baseline (or reference) rate of gas consumption by an appliance that consumes fixed gas flowrate. As the system operates, it measures and/or obtains data indicating that a flowrate of gas at a service point is within a first threshold value of the baseline flowrate of gas, indicating that the appliance is operating but other appliances are not operating. Accordingly, the flowrate indicates use of gas by the fixed-flowrate appliance having the baseline gas use rate. The system obtains a delta value indicating a magnitude by which the measured flowrate of gas is less than the baseline flowrate of gas at the service point. Thus, the system may subtract the flowrate from the baseline of the appliance, obtaining a positive "delta" value indicating an amount by which the fixed-flowrate appliance is being "starved" for gas. The system compares the delta value to a second threshold value to determine if the magnitude of the delta value indicates a low gas-pressure condition at the service point, i.e., if the delta is large enough in magnitude to indicate a problem. If the flowrate is enough below the baseline (i.e., if the "delta" is large enough), it may indicate a low gas-pressure condition. The system may receive information from a group of service points connected to a same gas supply pipe as the service point. The information from each service point may include a measure by which a measured flowrate is less than a baseline flowrate of a fixed-flowrate appliance at the service point. Thus, the system checks other service points to see if they have appliances that are operating on less than normal gas usage rates. Accordingly, the system may determine that a region of low gas-pressure exists at the group of service points based at least in part on the received information. Responsive to a positive determination of existence of the region of low gas-pressure the system may report the condition and/or perform corrective measures, such as attaching portable gas sources (e.g., gas tanker trucks) to appropriate gas mains.

At block 1602, gas consumption data associated with an amount of gas consumed at a service point is received. Upon receipt at a processing location, the gas consumption data may be disaggregated to reveal baseline flowrates of some or all fixed gas flowrate appliances. In an example, the receipt of the data and/or the disaggregating may be performed by operation of any part(s) of the system of FIG. 1, devices of FIGS. 2 and/or 3, and/or the methods of FIGS. 3-8. The baseline (or reference) gas flowrate is the gas flowrate of an appliance that is a regular consumer of gas. Appliances that may have regular flowrates include many hot water tanks and furnaces.

At block 1604, a baseline flowrate of gas that is used by a regular consumer (i.e., a fixed gas flowrate consumer, such as an appliance) of gas is determined, based at least in part on the disaggregating. The regular consumer of gas may be a hot water tank, a gas furnace, or the hot water tank and the furnace in simultaneous operation.

At block 1606, a flowrate of gas measured at the service point is obtained that is within a first threshold value of the baseline flowrate of the appliance. In an example, the flowrate of gas may be obtained by a smart metering device (e.g., if metrology device 126 of FIG. 1 is a smart or solid-state device). Alternatively, the flowrate of gas may be obtained or calculated by a remote computing device (e.g., the server 106 of FIG. 1) if the metrology device 126 is a mechanical device. In an example, a metrology module may detect a flowrate of gas that is close enough (i.e., within the threshold value) to a known baseline flowrate of a fixed gas flowrate appliance to assume that the measured flowrate indicates operation of the regular consumer of gas (i.e., the appliance). In an example, the system may compare the obtained flowrate of gas to each of a plurality of baseline flowrates associated with a respective plurality of regular consumers of gas at the service point. The plurality of baseline flowrates may be stored on the smart metering device (e.g., at consumption log 226) or may be stored at a remote server. The comparisons may result in a match of the measured flowrate of gas to the appliance to within the first threshold value.

In some older metering devices, obtaining the flowrate of gas measured at the service point may include measuring time(s) between switch closures of a gas meter or metrology device at the service point. In newer solid-state metering devices, the flowrate may be obtained directly from the metrology device.

At block 1608, a delta value indicating that the flowrate of gas that is less than the baseline flowrate of gas at the service point is obtained. In an example, the measured flowrate of gas is less than the baseline gas flowrate of the appliance or other regular consumer of gas. The amount by which the measured flowrate is less than the baseline flowrate may be called the "delta," and may indicate that the appliance is not able to receive its baseline flowrate of gas. That is, the appliance is being "starved" for gas by a low gas-pressure event or condition wherein less than the prescribed gas pressure is received by the gas meter of the service site of the appliance.

At block 1610, the delta value is compared to a second threshold value. A delta of sufficient magnitude—that exceeds the threshold value—may indicate that the appliance is not receiving the gas flowrate that it requires as a fixed gas flowrate appliance.

The delta value indicates an amount by which the measured flowrate of gas is less than the baseline flowrate of gas for an appliance. In some examples, the delta value may be a scalar value, which is compared to a scalar threshold value. In other examples, a plurality of measurements allows calculation of a standard deviation. In a specific example, if the baseline flowrate is within one standard deviation, a low gas-pressure condition is not indicated; otherwise, the low gas-pressure condition is indicated.

At block 1612, responsive to the delta value exceeding the second threshold value, it is determined if a low gas-pressure condition exists at the service site. In an example, if a fixed gas flowrate appliance is using less gas than its baseline flowrate, and the amount by which usage is less is greater than the delta value, then it may be assumed that a low gas-pressure condition is present at the service site. Some or all of the operations 1602-1612 may have been performed at a smart metering device and/or at a remote server and/or data processing device. In some instances, data may be sent over a network to or from an analytics application. The data may include an identification of the service point and the delta value or information from which the delta value may be derived. In other instances, a message may be sent announcing the low gas-pressure condition.

At block 1614, delta values from other service points supplied by a gas pipeline that supplies the service point are compared to a threshold value (e.g., the threshold value of block 1610 or a different threshold value). In an example, a low gas-pressure condition may be local to the service point discussed with respect to blocks 1602-1612. Alternatively, the low gas-pressure condition may involve a plurality of service points and/or customers.

At block 1616, if the delta values of the other service points exceeded the threshold value, then a regional low gas-pressure condition or event may be determined, reported and addressed. In an example, the low-pressure region may be re-pressurized. Depending on the size of the region and the gas pressure, an additional quantity of gas may be sent to the region. The quantity of gas may be based at least in part on one or more delta values from a respective one or more service points. That is, the quantity of gas may be based on how much the gas pressure is below a preferred level.

Method 1600 may be performed using data generated from two or more gas metering devices. Accordingly, the service point described above with respect to blocks 1602-1612 may be considered a first service point. In an example, a second service point performs the same or similar actions. In a further example, the second service point may perform the actions at times that are offset from the actions performed by the first service point. Advantageously, by using offset timing, a low gas-pressure condition may be recognized by one meter at a time that another meter is conserving battery power and not making calculations. In an example, if one meter recognizes a possible low gas-pressure condition, another gas meter may wake from a battery power conservation mode to try to confirm the low gas-pressure condition.

Method 1600 may be performed at regular intervals, at random intervals or other intervals. In an example that may save battery power, gas flow may be measured at a metrology device of the service point at times based at least in part on expected times of operation of the regular consumer(s) of gas.

Example Recognition of Low Gas Pressure Supply at Service Point

FIG. 17 shows an example method 1700 to determine if two or more service sites are experiencing a low gas-pressure condition, i.e., lower than desired or designed gas pressure is presented to the meter of a service site by the piping of the system.

At block 1702, a flowrate of gas at a first device is obtained. In an example, the first device may be a gas meter at a first gas service site, i.e., a customer's location.

At block 1704, the flowrate of gas may be disaggregated to obtain a representation of a flowrate of gas corresponding to an appliance having a generally fixed-rate of gas consumption.

At block 1706, based at least in part on the representation of the flowrate of gas corresponding to the appliance, and based at least in part on a representation of historical gas flowrate to the appliance, it may be determined that gas pressure at the first device is lower than expected.

At block 1708, information from a second device indicative of its gas pressure may be obtained. In an example, the second device may be a gas meter at a second gas service site. A disaggregation of the gas flow of the second service site may indicate that a fixed-rate of gas-consumption appliance is using too little gas; that is, the service is unable to provide the accustomed flowrate to the appliance.

At block 1710, based on the gas pressure at the first device being lower than expected and based on the obtained information from the second device indicative of its gas pressure, it is determined whether a low gas pressure situation exists in a regional area. If one service location had low gas pressure, it could be indicative of either a customer that had added appliances and outgrown the service at the service site, or a low gas-pressure condition in a region. If two service sites are seeing low gas pressure, it is likely that a low gas pressure condition exists in a region.

At block 1712, a message is generated, e.g., based on the determination at block 1710. The message may include data such as the (low) gas pressures and identifications of the respective service sites experiencing those conditions.

At block 1714, the message is transmitted, e.g., from service site(s) to utility company headend, or within servers of the headend. As indicated at block 1810 (FIG. 18) the region of low pressure can then be re-pressurized, such as by operation of control circuits of the headend and/or by settings and valves operated by utility work crew members.

Example Recognition of Low Gas Pressure Supply at Service Point

FIG. 18 shows an example method 1800 to determine if two or more service sites are experiencing a low gas-pressure condition, i.e., lower than desired or designed gas pressure is presented to the meter of a service site by the piping of the system. At block 1802, a first indication of a first potential low gas pressure condition is acquired at a first service site. At block 1804, a second indication of a second potential low gas pressure condition is acquired at a second service site. In an example, the first and second indications may be based at least in part on gas flowrates, rather than pressure measurements. The gas flowrates may be based on gas being used by one or more fixed-rate of gas-consumption appliances in each of the two service sites. The gas flowrates to the fixed-rate of gas-consumption appliances may be based on disaggregation of a gas flow to a respective service site.

At block 1806, based at least in part on the first indication and based at least in part on the second indication, it may be determined whether a low-pressure condition is present for a region of the first and second service sites. In the example of block 1808, flowrates of gas may be disaggregated to check for low gas pressure at each of the first and second service sites.

At block 1810, one or more actions may be taken in response to the determination that a low-pressure gas region includes at least the first and second service sites. In one example, a message reporting the low gas pressure of the first and second service sites may be transmitted, such as to a utility company, governmental entity, etc. In another example, the region of low gas pressure may be re-pressurized. The re-pressurization may be performed by a gas utility company, which may send additional gas to the region.

Example Recognition of Low Gas Pressure Supply at Service Point

The following numbered clauses include additional examples to determine if one or more service sites are experiencing a low gas-pressure condition.

1. A method, comprising: obtaining a flowrate of gas at a first device; disaggregating the flowrate of gas to obtain a representation of a flowrate of gas corresponding to an appliance having a generally fixed-rate of gas consumption; determining, based at least in part on the representation of the flowrate of gas corresponding to the appliance, and based at least in part on a representation of historical gas flowrate to the appliance, that gas pressure at the first device is lower than expected; obtaining information from a second device indicative of its gas pressure; determining, based on the gas pressure at the first device being lower than expected and based on the obtained information from the second device indicative of its gas pressure, whether a low gas pressure situation exists in a regional area; generating a message, based at least in part on the determination; and transmitting the message.

2. The method of clause 1, wherein: the method is performed by a headend device; or the method is performed at least in part by an endpoint associated with a gas service site.

3. The method of clause 1, wherein transmitting the message comprises at least one of: transmitting the message to a headend device; transmitting the message to an endpoint associated with a gas service; or transmitting the message to service personnel.

4. The method of clause 1, wherein the message tells a headend device that an endpoint associated with a gas service site is experiencing low gas pressure.

5. The method of clause 1, wherein determining whether the low gas pressure situation exists for the regional area comprises: determining that the flowrate of gas corresponding to the appliance is less than the representation of historical gas flowrate by the appliance.

6. The method of clause 1, wherein determining whether the low gas pressure situation exists for the regional area comprises: determining if at least one fixed-rate gas appliance in each of at least two service locations has a lower than historical flowrate.

7. The method of clause 1, additionally comprising: determining if a gas pipeline serves at least one fixed-rate gas appliance having a lower than historical flowrate in each of at least two service locations.

8. The method of clause 1, wherein: the method is performed at least in part by a first endpoint and performed at least in part by a second endpoint; and the first endpoint and the second endpoint are on a same gas supply pipeline.

9. The method of clause 8, additionally comprising: re-pressurizing a low gas-pressure area using a quantity of gas based at least in part on a size of the regional area affected by low gas pressure.

10. The method of clause 1, wherein: the method is performed by a first endpoint and performed by a second endpoint; and the first endpoint and the second endpoint are on a same gas supply pipeline.

11. A gas meter, comprising: a processor; a metrology unit controlled by the processor; a radio controlled by the processor; and a memory device in communication with the processor, and containing statements, which when executed by the processor perform actions comprising: obtaining a flowrate of gas at a first device; disaggregating the flowrate of gas to obtain a representation of a flowrate of gas corresponding to an appliance having a generally fixed-rate of gas consumption; determining, based at least in part on the representation of the flowrate of gas corresponding to the appliance, and based at least in part on a representation of historical gas flowrate to the appliance, that gas pressure at the first device is lower than expected; obtaining information from a second device indicative of its gas pressure; determining, based on the gas pressure at the first device being lower than expected and based on the obtained information from the second device indicative of its gas pressure, whether a low gas pressure situation exists in a regional area; generating a message, based at least in part on the determination; and transmitting the message.

12. The gas meter of clause 11, wherein the message is transmitted to a second gas meter, and wherein the message indicates a need for the second gas meter to determine if it is within the low gas pressure situation.

13. The gas meter of clause 11, wherein the message is transmitted to a headend device, and wherein the message indicates that the gas meter is within the regional area.

14. The gas meter of clause 11, wherein the message is updated when the gas meter is no longer associated with the low gas pressure situation.

15. The gas meter of clause 11, wherein the memory device contains at least one representation of historical gas flowrate of at least one appliance.

16. A method, comprising: acquiring a first representation of a first flowrate at a first service site; acquiring a second representation of a second flowrate at a second service site; determining, based at least in part on the first representation, and based at least in part on the second representation, whether a low-pressure condition is present for a region; and taking an action to overcome the low-pressure condition.

17. The method of clause 16, wherein: the method is performed by a headend device; or the method is performed by an endpoint associated with a gas service site.

18. The method of clause 16, wherein the action comprises one or more of: sending a message indicating a possible need to re-pressurize gas in the region; and re-pressurizing the region to overcome the low-pressure condition.

19. The method of clause 16, wherein: acquiring the first representation comprises disaggregating a flowrate of gas of the first service site to obtain the first representation, wherein the first representation comprises gas used by an appliance at the first service site having a generally fixed-rate of gas consumption; and acquiring the second representation comprises disaggregating a flowrate of gas of the second service site to obtain the second representation, wherein the second representation comprises gas used by an appliance at the second service site having a generally fixed-rate of gas consumption.

20. The method of clause 16, wherein the method additionally comprises: disaggregating flowrates at the first service site and at the second service site to obtain: the first flowrate at the first service site, wherein the first flowrate represents gas used by a first generally fixed-rate of gas use appliance at the first service site; and the second flowrate at the second service site, wherein the second flowrate represents gas used by a second generally fixed-rate of gas use appliance at the second service site; obtaining gas pressure information based at least in part on the first flowrate, the second flowrate, and historical gas usage at the first service site and the second service site.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    recognizing changes in a gas consumption rate of an appliance associated with a degradation of the appliance over time, wherein the changes in the gas consumption rate result in a new rate of gas consumption by the appliance;
    associating the new rate of consumption with the appliance;
    obtaining a first flowrate of gas by a device at a service site;
    disaggregating the first flowrate of gas to recognize the new rate of gas consumption within the first flowrate of gas;
    comparing the new rate of gas consumption by the appliance to historical gas consumption by the appliance;
    determining, based at least in part on the comparing, that consumption by the appliance has changed over time;
    generating a notification indicating changed consumption by the appliance indicative of degradation of the appliance over time, based at least in part on the determining; and
    transmitting the notification to another device.

2. The method of claim 1, wherein at least some of method is performed at:
    a server at a central office; or
    a data processing component of the device at the service site.

3. The method of claim 1, wherein obtaining the first flowrate of gas at the service site comprises:
    obtaining data regarding time between switch closures;
    obtaining data regarding a number of switch closures over time; or
    obtaining data from a metrology device that can directly measure the first flowrate of gas.

4. The method of claim 1, wherein the historical gas consumption by the appliance comprises:
    a record of gas consumption and a record of corresponding environmental conditions.

5. The method of claim 1, additionally comprising:
    selecting the historical gas consumption by the appliance based at least in part on environmental conditions.

6. The method of claim 1, wherein comparing the new rate of gas consumption by the appliance to the historical gas consumption by the appliance comprises:
    compensating for differences in environmental conditions at times the new rate of gas consumption by the appliance and the historical gas consumption by the appliance were measured.

7. The method of claim 1, wherein determining that the consumption by the appliance has changed over time comprises:
    determining that a duration of a period of usage has changed compared to the historical gas consumption by the appliance.

8. The method of claim 1, wherein determining that the consumption by the appliance has changed over time comprises:
    determining that a time between periods of usage has changed compared to the historical gas consumption by the appliance.

9. The method of claim 1, wherein determining that the consumption by the appliance has changed over time comprises:
    determining that an amplitude of usage has changed compared to the historical gas consumption by the appliance.

10. The method of claim 1, wherein determining that consumption by of the appliance has changed over time comprises:
    determining that a peak amplitude of usage has changed compared to the historical gas consumption by the appliance.

11. The method of claim 1, wherein the transmitting the notification to another device comprises transmitting the notification to an in-home device.

12. A headend device, comprising:
a processor;
a network connection; and
one or more computer-readable media storing computer-executable instructions that, when executed by the processor, configure the headend device to perform operations comprising:
  recognizing changes in a gas consumption rate of an appliance associated with a degradation of the appliance over time, wherein the changes in the gas consumption rate result in a new rate of gas consumption by the appliance;
  associating the new rate of consumption with the appliance;
  obtaining a first flowrate of gas by a device at a service site;
  disaggregating the first flowrate of gas to obtain recognize the new rate of gas consumption within the first flowrate of gas;
  comparing the new rate of gas consumption by the appliance to historical gas consumption by the appliance;
  determining, based at least in part on the comparing, that consumption by the appliance has changed over time;
  generating a notification indicating changed consumption by the appliance indicative of degradation of the appliance over time, based at least in part on the determining; and
  transmitting the notification to another device.

13. The headend device as recited in claim 12, wherein disaggregating the first flowrate of gas comprises:
  adjusting a disaggregation function based at least in part on historical data indicating a change in gas consumption of the appliance over time.

14. The headend device as recited in claim 12, wherein the appliance is located at a first service point, and wherein the comparing additionally comprises:
  comparing the new rate of gas consumption by the appliance to a gas consumption by a second appliance at a second service point.

15. The headend device as recited in claim 12, wherein the historical gas consumption by the appliance comprises at least one of:
  an ambient air temperature;
  an incoming gas temperature; and
  an incoming water temperature.

16. One or more non-transitory computer-readable media storing computer-executable instructions that, when executed by one or more processors, configure a computing device to perform acts comprising:
  recognizing changes in a gas consumption rate of an appliance associated with a degradation of the appliance over time, wherein the changes in the gas consumption rate result in a new rate of gas consumption by the appliance;
  associating the new rate of consumption with the appliance;
  obtaining a first flowrate of gas by a device at a service site;
  disaggregating the first flowrate of gas to recognize the new rate of gas consumption within the first flowrate of gas;
  comparing the new rate of gas consumption by the appliance to historical gas consumption by the appliance;
  determining, based at least in part on the comparing, that consumption by the appliance has changed over time;
  generating a notification indicating changed consumption by the appliance indicative of degradation of the appliance over time, based at least in part on the determining; and
  transmitting the notification to another device.

17. One or more non-transitory computer-readable media as recited in claim 16, wherein determining that performance of the appliance has changed over time comprises:
  determining that a duration of a period of usage has changed compared to the historical gas consumption by the appliance.

18. One or more non-transitory computer-readable media as recited in claim 16, wherein determining that performance of the appliance has changed over time comprises:
  determining that a time between periods of usage has changed compared to the historical gas consumption by the appliance.

19. One or more non-transitory computer-readable media as recited in claim 16, wherein determining that performance of the appliance has changed over time comprises:
  determining that an amplitude of usage has changed compared to the historical gas consumption by the appliance.

20. One or more non-transitory computer-readable media as recited in claim 16, wherein the historical gas consumption by the appliance comprises at least one of:
  an ambient air temperature;
  an incoming gas temperature; and
  an incoming water temperature.

* * * * *